United States Patent
Tsubaki

(10) Patent No.: US 11,347,133 B2
(45) Date of Patent: May 31, 2022

(54) IMAGE CAPTURING APPARATUS, IMAGE PROCESSING APPARATUS, CONTROL METHOD, AND STORAGE MEDIUM

(71) Applicant: CANON KABUSHIKI KAISHA, Tokyo (JP)

(72) Inventor: Hidetoshi Tsubaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 43 days.

(21) Appl. No.: 16/843,482

(22) Filed: Apr. 8, 2020

(65) Prior Publication Data
US 2020/0326609 A1 Oct. 15, 2020

(30) Foreign Application Priority Data
Apr. 12, 2019 (JP) .............................. JP2019-076564

(51) Int. Cl.
G03B 13/20 (2021.01)
G03B 13/36 (2021.01)
H04N 5/232 (2006.01)

(52) U.S. Cl.
CPC ............. *G03B 13/20* (2013.01); *G03B 13/36* (2013.01); *H04N 5/232121* (2018.08)

(58) Field of Classification Search
CPC .... G03B 13/20; G03B 13/36; H04N 5/23212; H04N 5/232122
See application file for complete search history.

(56) References Cited

U.S. PATENT DOCUMENTS

| 2012/0300092 A1* | 11/2012 | Kim ..................... H04N 5/2621 348/222.1 |
| 2015/0062384 A1* | 3/2015 | Tanaka ................. H04N 5/2628 348/240.2 |
| 2018/0286020 A1* | 10/2018 | Kawai ................ H04N 5/23229 |

FOREIGN PATENT DOCUMENTS

JP 2016-099322 A 5/2016

OTHER PUBLICATIONS

Steven M. Seitz et al. "View Morphing", Proc. SIGGRAPH 96, pp. 21-30, Cited in Specification in paragraphs [0061].
Ken Masuda "Advanced Guide to Computer Vision 3", Chapter 2, "ICP Algorithms", pp. 33-62, Cited in Specification in paragraphs [0134].

* cited by examiner

Primary Examiner — Noam Reisner
(74) Attorney, Agent, or Firm — Cowan, Liebowitz & Latman, P.C.

(57) ABSTRACT

There is provided an image capturing apparatus comprising an image sensor that outputs a plurality of parallax images in a single instance of shooting, the parallax images having different viewpoints. A shooting control unit carries out, using the image sensor, first shooting and a plurality of instances of second shooting. The plurality of instances of second shooting is carried out under a shooting condition in which a depth of field is shallower than in the first shooting. A generating unit generates a plurality of range images corresponding to the plurality of instances of second shooting. A detection unit detects an amount of positional skew, relative to a first image generated through the first shooting, of each of a plurality of second images generated through the plurality of instances of second shooting.

13 Claims, 18 Drawing Sheets

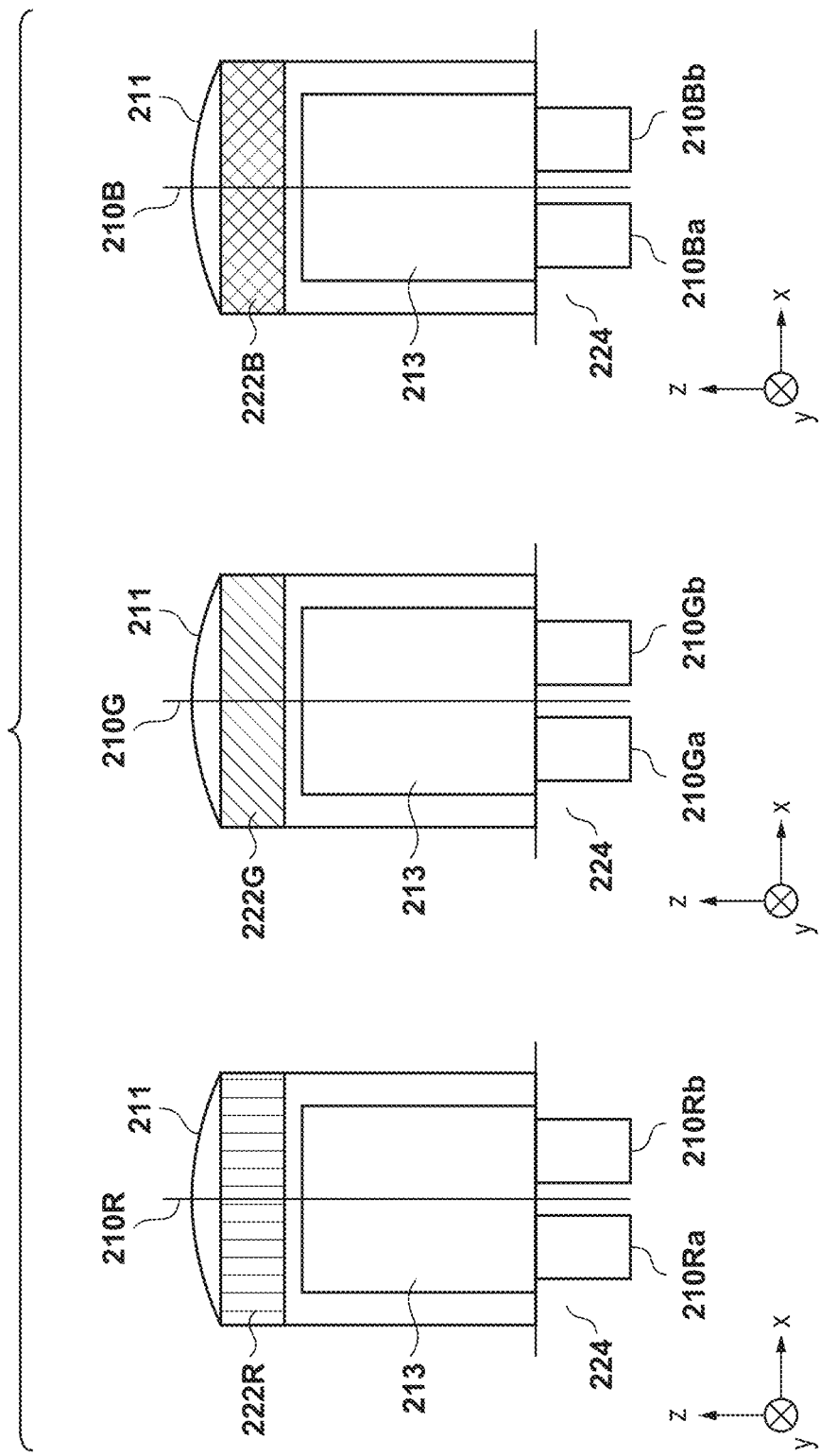

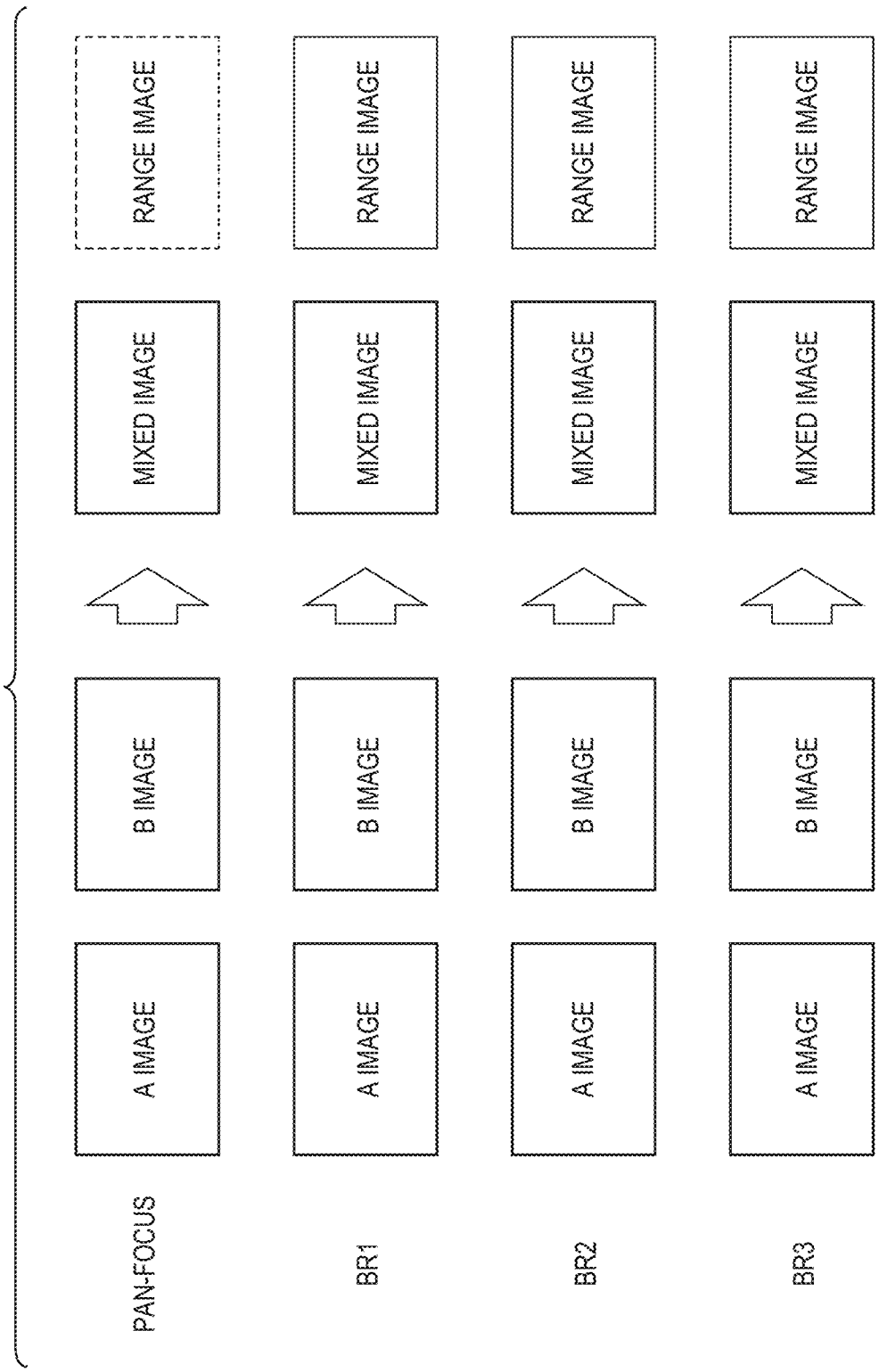

FIG. 13A
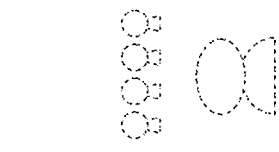
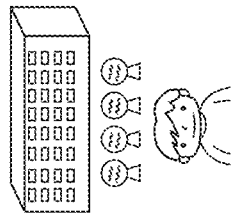
FIG. 13B
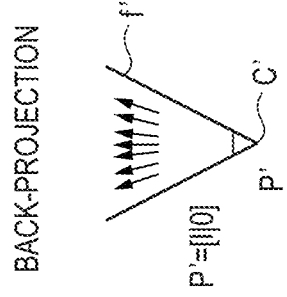
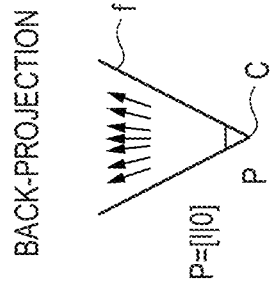
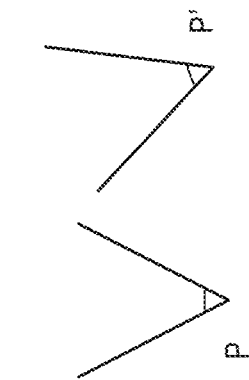

FIG. 15A
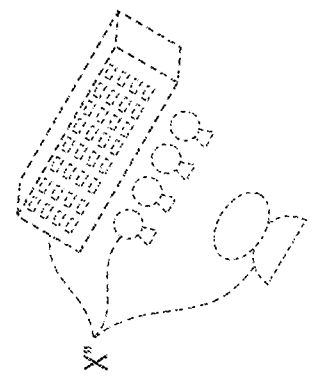
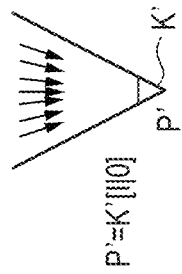
FIG. 15B
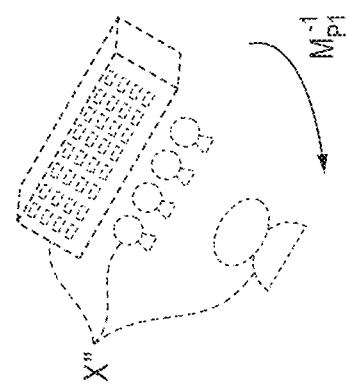
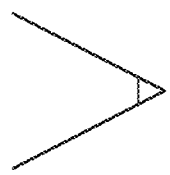
FIG. 15C
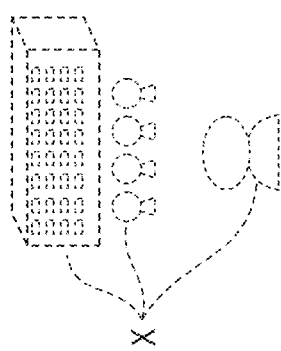
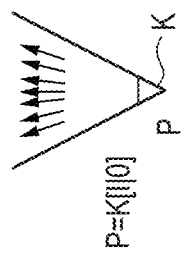

IMAGE CAPTURING APPARATUS, IMAGE PROCESSING APPARATUS, CONTROL METHOD, AND STORAGE MEDIUM

BACKGROUND OF THE INVENTION

Field of the Invention

The present invention relates to an image capturing apparatus, an image processing apparatus, a control method, and a storage medium.

Description of the Related Art

Using a pupil division optical system in the optical system of an image capturing apparatus is known as one way to further reduce the size of a stereo camera, which inexpensively realizes an image rangefinding function. This is an optical technique in which a plurality of photoelectric conversion units are formed below a single microlens on an image sensor and light beams from a subject passing through the pupil of the optical system are split into two or more parts, which makes it possible to capture a plurality of parallax images simultaneously.

However, in a pupil division image capturing system, i.e., an image capturing system using a pupil division optical system, the baseline length is typically shorter than in a stereo camera in which two optical systems are arranged side-by-side. As such, a subject must be shot at close range in order to obtain an accurate range image. When focusing at a close range in order to take an up-close shot of a subject, the depth of field will drop, causing objects that are not close to the in-focus position to become blurry. This makes it difficult to obtain a range image with a broad span with respect to the depth direction. Specifically, when shooting a large object, when shooting a subject at close range in order to achieve a more precise distance, and so on, anything more than slightly outside the narrow focus location will become blurry, and obtaining a range image over the full angle of view is difficult unless the aperture value is reduced. If the aperture value is reduced, however, the distance either cannot be measured at all, or cannot be measured accurately. A pupil division image capturing system has a characteristic whereby increasing the aperture by reducing the F-stop value, or moving closer to the subject, in order to increase the rangefinding accuracy reduces the span of the depth over which distances can be measured.

Accordingly, a technique for obtaining a range image with a pupil division image capturing system has been proposed in which a range image is obtained at each of a plurality of in-focus positions while varying the in-focus position in the depth direction through focus bracketing, and then integrating the plurality of range images to obtain a range image having a broad rangefinding span (Japanese Patent Laid-Open No. 2016-99322). Unlike Depth From Defocus (DFD) techniques and the like, which measure distances by analyzing differences in the blur from bracket to bracket, the bracketing in this technique is carried out with the aim of shifting the rangefinding span. This means that broader steps can be used in the focus bracketing, which is advantageous in that the number of images to be processed, the amount of memory used, and so on can be reduced.

Stereo rangefinding using a small number of divisions has a characteristic whereby the stereo association is likely to include erroneous association. In this case, variations in the point of view, variations in illumination, minute variations in the subject, and so on during hand-held shooting can sometimes be employed. In such situations, the distance measurement accuracy can also be improved by repeatedly obtaining distance measurements through fixed-focus continuous shooting and then using time-direction filtering to suppress distance measurement detection error outliers caused by erroneous associations.

However, with the configuration disclosed in Japanese Patent Laid-Open No. 2016-99322, if hand shake, tripod shake, or the like occurs when shooting using the pupil division image capturing system, positional skew will arise among the plurality of range images obtained through continuous shooting and make it difficult to integrate the range images. Furthermore, when subjects are present at discrete positions with respect to the depth direction, the steps at which the focus brackets are changed, or the like, differences in the blur among the bracket images sometimes results in some subjects lacking common regions between the bracket images, no common regions being present between range images, and so on.

Even when using fixed-focus continuous shooting, if the aperture is on the open side and the depth of field is shallow, hand shake in the front-and-back direction will produce different kinds of blur in the subject textures among the shot images, different range images resulting from the distance measurement, and so on, in the same manner as with the configuration of Japanese Patent Laid-Open No. 2016-99322; this eliminates common regions and makes it difficult to integrate the range images.

There is thus an issue in hand-held shooting using a pupil division image capturing system in that a range image with a broad rangefinding span in the depth direction cannot be obtained accurately for all desired compositions and angles of view.

SUMMARY OF THE INVENTION

Having been achieved in light of such circumstances, the present invention provides a technique that accurately corrects positional skew among a plurality of range images obtained through continuous shooting.

According to a first aspect of the present invention, there is provided an image capturing apparatus, comprising: an image sensor that outputs a plurality of parallax images in a single instance of shooting, the parallax images having different viewpoints; and at least one processor and/or at least one circuit which functions as: a shooting control unit configured to, using the image sensor, carry out first shooting and a plurality of instances of second shooting, the plurality of instances of second shooting being carried out under a shooting condition in which a depth of field is shallower than in the first shooting; a generating unit configured to generate a plurality of range images corresponding to the plurality of instances of second shooting, each range image being generated on the basis of parallax among the plurality of parallax images generated in each instance of shooting; a detection unit configured to detect an amount of positional skew, relative to a first image generated through the first shooting, of each of a plurality of second images generated through the plurality of instances of second shooting; and a correction unit configured to correct positional skew among the plurality of range images on the basis of the amount of positional skew of each of the plurality of second images relative to the first image.

According to a second aspect of the present invention, there is provided an image processing apparatus comprising at least one processor and/or at least one circuit which functions as: an obtainment unit configured to obtain multiple sets of a plurality of parallax images having different viewpoints, each set corresponding to each one of a plurality of instances of shooting, and an image obtained from a single instance of shooting under a shooting condition in which a depth of field is shallower than in the plurality of instances of shooting; a generating unit configured to generate a range image corresponding to each instance of shooting on the basis of parallax among the plurality of parallax images obtained in each of the plurality of instances of shooting; a detection unit configured to detect an amount of positional skew, relative to a first image obtained from the single instance of shooting, of each of a plurality of second images obtained from the plurality of instances of shooting; and a correction unit configured to correct positional skew among the plurality of range images on the basis of the amount of positional skew of each of the plurality of second images relative to the first image.

According to a third aspect of the present invention, there is provided a control method of an image capturing apparatus having an image sensor that outputs a plurality of parallax images in a single instance of shooting, the parallax images having different viewpoints, the method comprising: using the image sensor to carry out first shooting and a plurality of instances of second shooting, the plurality of instances of second shooting being carried out under a shooting condition in which a depth of field is shallower than in the first shooting; generating a plurality of range images corresponding to the plurality of instances of second shooting, each range image being generated on the basis of parallax among the plurality of parallax images generated in each instance of shooting; detecting an amount of positional skew, relative to a first image generated through the first shooting, of each of a plurality of second images generated through the plurality of instances of second shooting; and correcting positional skew among the plurality of range images on the basis of the amount of positional skew of each of the plurality of second images relative to the first image.

According to a fourth aspect of the present invention, there is provided a control method of an image processing apparatus, comprising: obtaining multiple sets of a plurality of parallax images having different viewpoints, each set corresponding to each one of a plurality of instances of shooting, and an image obtained from a single instance of shooting under a shooting condition in which a depth of field is shallower than in the plurality of instances of shooting; generating a range image corresponding to each instance of shooting on the basis of parallax among the plurality of parallax images obtained in each of the plurality of instances of shooting; detecting an amount of positional skew, relative to a first image obtained from the single instance of shooting, of each of a plurality of second images obtained from the plurality of instances of shooting; and correcting positional skew among the plurality of range images on the basis of the amount of positional skew of each of the plurality of second images relative to the first image.

According to a fifth aspect of the present invention, there is provided a non-transitory computer-readable storage medium which stores a program for causing a computer of an image capturing apparatus to execute a control method, the image capturing apparatus having an image sensor that outputs a plurality of parallax images in a single instance of shooting, the parallax images having different viewpoints, the method comprising: using the image sensor to carry out first shooting and a plurality of instances of second shooting, the plurality of instances of second shooting being carried out under a shooting condition in which a depth of field is shallower than in the first shooting; generating a plurality of range images corresponding to the plurality of instances of second shooting, each range image being generated on the basis of parallax among the plurality of parallax images generated in each instance of shooting; detecting an amount of positional skew, relative to a first image generated through the first shooting, of each of a plurality of second images generated through the plurality of instances of second shooting; and correcting positional skew among the plurality of range images on the basis of the amount of positional skew of each of the plurality of second images relative to the first image.

According to a sixth aspect of the present invention, there is provided a non-transitory computer-readable storage medium which stores a program for causing a computer of an image processing apparatus to execute a control method comprising: obtaining multiple sets of a plurality of parallax images having different viewpoints, each set corresponding to each one of a plurality of instances of shooting, and an image obtained from a single instance of shooting under a shooting condition in which a depth of field is shallower than in the plurality of instances of shooting; generating a range image corresponding to each instance of shooting on the basis of parallax among the plurality of parallax images obtained in each of the plurality of instances of shooting; detecting an amount of positional skew, relative to a first image obtained from the single instance of shooting, of each of a plurality of second images obtained from the plurality of instances of shooting; and correcting positional skew among the plurality of range images on the basis of the amount of positional skew of each of the plurality of second images relative to the first image.

Further features of the present invention will become apparent from the following description of exemplary embodiments with reference to the attached drawings.

BRIEF DESCRIPTION OF THE DRAWINGS

FIGS. 2A to 2F are diagrams illustrating a pupil division image capturing system.

FIG. 9 is a conceptual diagram illustrating parallax images, mixed images, and range images obtained through pan-focus shooting and focus bracket continuous shooting.

FIGS. 13A to 13C are diagrams illustrating a process for refining relative positions/attitudes.

FIGS. 15A to 15C are diagrams illustrating positional skew correction through viewpoint conversion.

DESCRIPTION OF THE EMBODIMENTS

Figure 1:
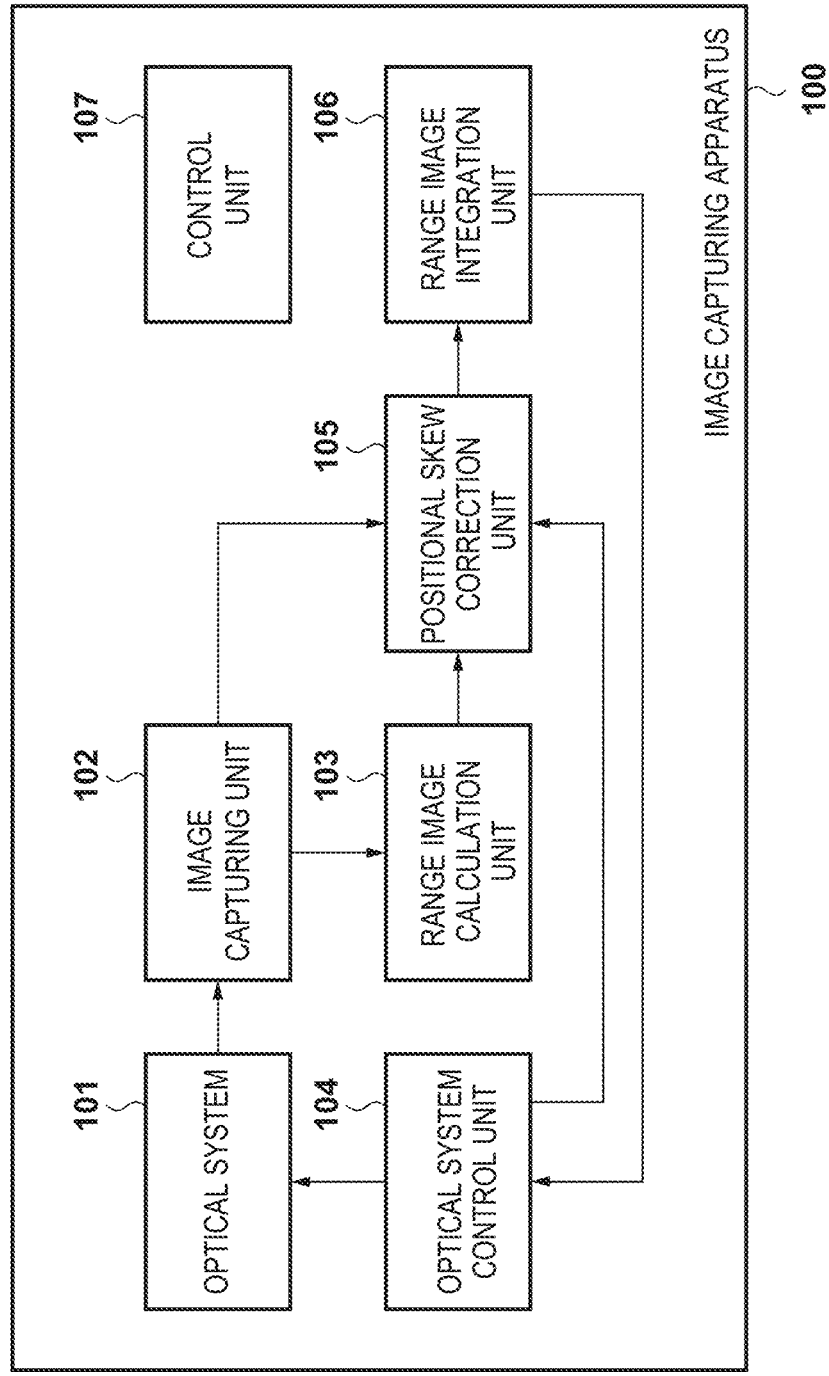
FIG. 1 is a block diagram illustrating the configuration of an image capturing apparatus 100 according to a first embodiment.

Hereinafter, embodiments will be described in detail with reference to the attached drawings, Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram illustrating the configuration of an image capturing apparatus 100, which is an example of an image processing apparatus. In FIG. 1, an optical system 101 is a component that forms incident light from a subject 150 into an image, and includes a plurality of lenses and mirrors. An image capturing unit 102 is a component that receives the optical image formed by the optical system 101 and converts that image into a digital image. By forming a plurality of photoelectric conversion units under each of microlenses formed on a light-receiving surface of the image capturing unit 102, subject light beams passing through the pupil of the optical system 101 can be divided, which makes it possible to capture a plurality of parallax images simultaneously. An image capturing system configured in this manner is called a "pupil division image capturing system".

Figure 2A:
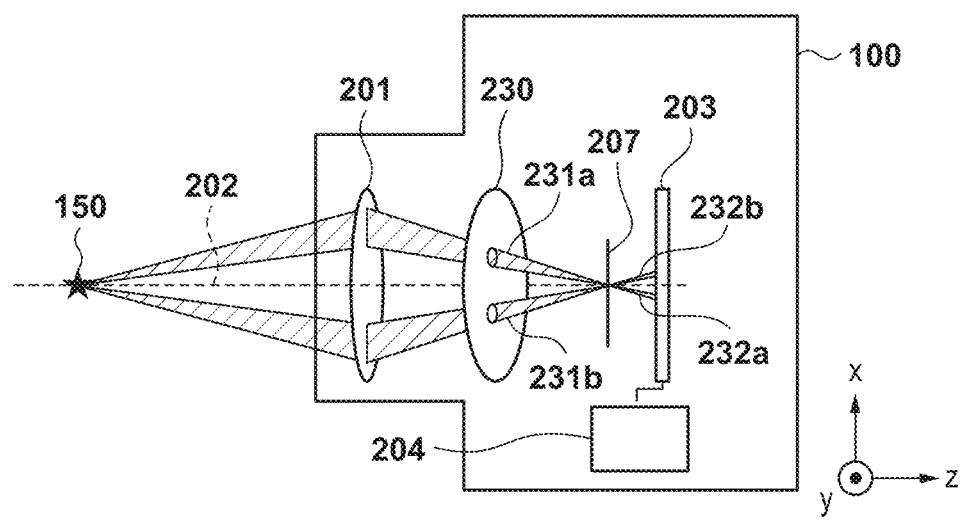
Figure 2B:
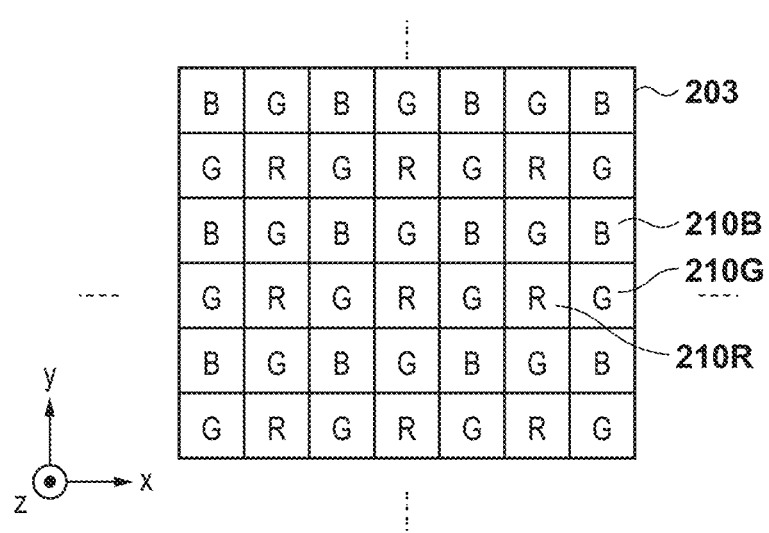

The pupil division image capturing system constituted by the optical system 101 and the image capturing unit 102 will be described with reference to FIGS. 2A to 2F. FIG. 2A illustrates the subject 150, an image forming optical system 201, an optical axis 202 of the image forming optical system 201, an image sensor 203, and a computation/processing unit 204. As illustrated in FIG. 29, the image sensor 203 is constituted by numerous pixels 210R, 210G, and 210B arranged in a matrix mapped to an x-y plane.

As can be seen in the cross-sectional view of FIG. 2C, each pixel in the image sensor 203 includes a microlens 211, a color filter 222R, 222G, or 222B, photoelectric conversion units 210Ra and 210Rb, 210Ga and 210Gb, or 210Ba and 210Bb, and a waveguide 213. In the image sensor 203, the color filter 222R, 222G, or 222B of each pixel imparts spectral properties according to the wavelength band to be detected, and thus each pixel primarily obtains red light, green light, or blue light. The pixels are arranged in the x-y plane in a known color arrangement pattern. A substrate 224 is a material that absorbs the wavelength band to be detected, e.g., Si, and the photoelectric conversion units are formed in at least some regions within the substrate 224 through ion implantation. The pixels include interconnects, which are not shown.

A light beam 232a passing through a pupil region 231a and a light beam 232b passing through a pupil region 231b, the pupil regions being different regions of an exit pupil 230, are incident on the photoelectric conversion unit 210Xa and the photoelectric conversion unit 210Xb (where X is R, G, or B). The photoelectric conversion unit 210Xa and the photoelectric conversion unit 210Xb obtain a first signal and a second signal, respectively, as a result. The first signal forms an A image, and the photoelectric conversion unit 210Xa that obtains the first signal is therefore called an "A pixel"; likewise, the second signal forms a B image, and the photoelectric conversion unit 210Xb that obtains the second signal is therefore called a "B pixel". The signals obtained by the photoelectric conversion units are sent to the computation/processing unit 204. On the basis of these signals, the computation/processing unit 204 carries out a process for generating two parallax images, as well as a color image from a specific viewpoint, which is one output.

FIG. 2I) is a diagram illustrating the pixel structure for each microlens 211 in the image sensor 203, in terms of the arrangement of the photoelectric conversion unit 210Xa (the A pixel) and the photoelectric conversion unit 210Xb (the B pixel), from the direction in which light is incident along the optical axis. FIG. 2D illustrates an example of the arrangement in a case where there are two viewpoints in the horizontal direction or the vertical direction. Note, however, that the number of viewpoints (the number of photoelectric conversion units per pixel) is not limited to two. For example, FIG. 2E illustrates an example of an arrangement in which the image sensor 203 includes four photoelectric conversion units per pixel, where pupil division is carried out in both the horizontal direction and the vertical direction. The number of photoelectric conversion unit divisions may be further increased to increase the number of viewpoints.

Figure 2F:
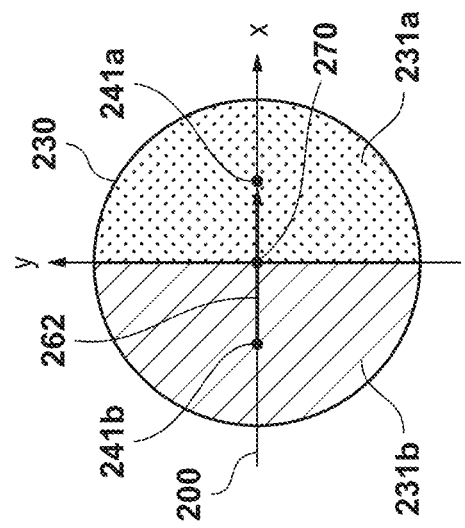
Figure 2E:
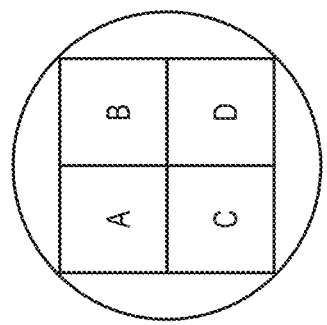
Figure 2D:
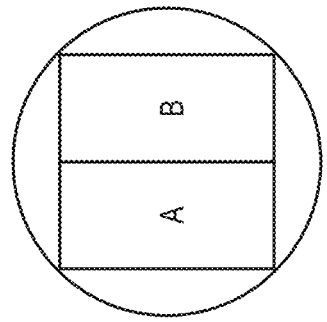

FIG. 2F is a diagram of the exit pupil 230 of the image forming optical system 201, seen from a point of intersection between the optical axis 202 and the image sensor 203 (a central image height) in FIG. 2A. The light beam 232a passing through the pupil region 231a and the light beam 232b passing through a pupil region 231b, the pupil regions being different regions of the exit pupil 230, are incident on the photoelectric conversion unit 210Xa and the photoelectric conversion unit 210Xb. A centroid position 241a is a centroid position of the pupil region 231a (a first centroid position and a centroid position 241h is a centroid position of the pupil region 231b (a second centroid position). The centroid position 241a is shifted (moved) from the center of the exit pupil 230 along an x axis 200. On the other hand, the centroid position 241b is shifted (moved) in the direction opposite from the centroid position 241a, along the x axis 200. A direction connecting the centroid position 241a and the centroid position 241b is called a "pupil division direction". Additionally, a distance between the centroid position 241a and the centroid position 241h (an inter-centroid distance) is called a "baseline length 262". The baseline length 262 corresponds to an interval between the centroids in a pupil sensitivity distribution, obtained by projecting a sensitivity distribution with respect to an angle of incidence of the pixel onto the surface of the exit pupil 230.

The positions of the A image and the B image change in the same direction as the pupil division direction (the x-axis direction, in the present embodiment) due to defocus. The amount of relative positional change between the images, i.e., the parallax amount between the A image and the B image, is an amount based on the defocus amount. As such, the parallax amount can be obtained through the method described later and then converted into a defocus amount or a distance through a known conversion method.

When the signal sent is an analog signal, the computation/processing unit 204 carries out basic processing on the electronic image, such as noise removal through correlated double sampling (CDS), exposure control by increasing the gain through automatic gain control (AGC), black level correction, A/D conversion, and the like. The computation/processing unit 204 obtains an image signal which has been converted into a digital signal as a result. Because the processing is primarily pre-processing on the analog signal, the main components in the computation/processing unit 204 are typically referred to as an analog front end (AFE). On the other hand, the components used as a set with a digital output sensor are sometimes referred to as a digital front end (DFE). Furthermore, the computation/processing unit 204 may generate a color image through Bayer array interpolation or the like. The computation/processing unit 204 may also carry out luminance image conversion on an image to be output to a range image calculation unit 103. The luminance image conversion may be a basic level for calculating the range image. Filtering processing such as low-pass or high-pass filtering, tone adjustment processing such as tone mapping, and the like may also be carried out to improve the accuracy, robustness, and so on of the range image calculation. When creating a preview image to be displayed in a display unit (not shown), a color image ultimately output as a set with the range image, and so on, the computation/processing unit 204 may generate the output color image or luminance image by selecting one of the plurality of parallax images, or by mixing a plurality of the parallax images. An image obtained by mixing a plurality of the parallax images (that is, an image corresponding to light beams passing through a plurality of pupil regions within the exit pupil) is called a "mixed image". The mixed image corresponds to one image formed using all the openings in the exit pupil 230 shown in FIG. 2F. Viewing the exit pupil 230 from the viewpoint of the mixed image, a centroid position 270 corresponds to the centroid position of that viewpoint.

Returning to FIG. 1, the range image calculation unit 103 is a component that calculates a range image from the plurality of parallax images output from the image capturing unit 102. The range image calculation unit 103 generates the range image on the basis of shooting information, which includes camera parameters determined on the basis of the zoom state of the optical system 101, such as the focal distance and aperture value, and image sensor information, such as the pitch of the pixels in the image sensor 203.

An optical system control unit 104 is a component that controls the aperture and zoom of the optical system 101. A positional skew correction unit 105 calculates amounts of skew in the positions and attitudes of a plurality of sets of parallax images obtained through a plurality of instances of shooting, as with bracket continuous shooting and the like (with each set including a plurality of parallax images), and in a plurality of range images generated by the range image calculation unit 103. The positional skew correction unit 105 then corrects the position and attitude skew (also simply called "positional skew correction" hereinafter) for one of the plurality of parallax images or the range image, as necessary. Note that the positional skew correction may be carried out by a range image integration unit 106.

The range image integration unit 106 carries out a process for integrating, into a single range image (an integrated range image), a plurality of range images corresponding to a plurality of sets of parallax images obtained from a plurality of instances of shooting, such as with bracket continuous shooting (that is, a number of sets of parallax images equivalent to a plurality of instances of shooting). The range image integration unit 106 may carry out a three-dimensional geometric transform with respect to the image capturing position of another image selected as a reference. Furthermore, the range image integration unit 106 may recalculate range images using a set of parallax images from a plurality of instances of shooting, as with bracket continuous shooting, and a positional skew correction amount.

A control unit 107 includes ROM storing a control program and RAM used as working memory, and controls the image capturing apparatus 100 as a whole by executing the control program.

Figure 3:
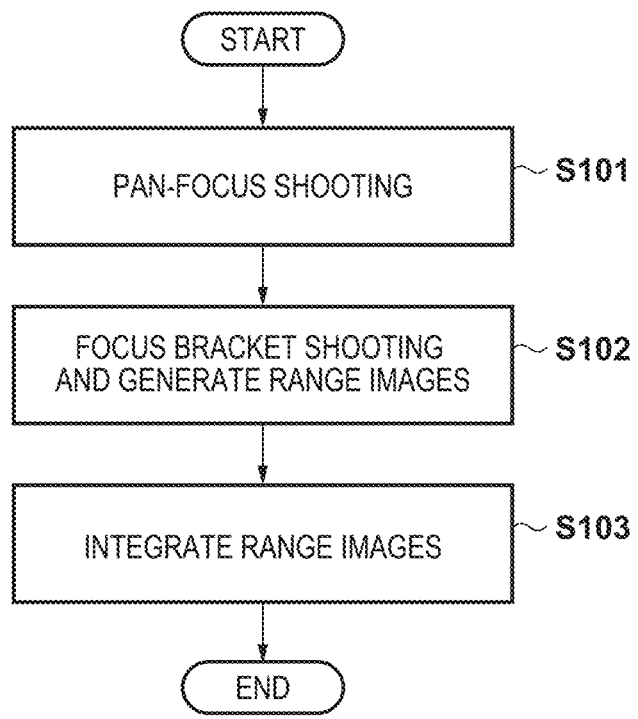
FIG. 3 is a flowchart illustrating a process for generating an integrated range image according to the first embodiment.

FIG. 3 is a flowchart illustrating a process for generating an integrated range image. The processes of steps S101 and S102 are executed as a series of operations after a user has pressed a shutter button (not shown) the image capturing apparatus 100 for his or her desired composition. The process of step S103 may be executed as a process continuing from steps S101 and S102, or may be executed after first using a GUI or the like to confirm with the user whether or not the process can be executed.

Note that control for sequentially determining a degree of hand shake in the continuous shooting of parallax images and the generation of range images, and then employing those results in error processing, can be carried out if the processes are executed in the order of steps S101 and S102 as illustrated in FIG. 3. However, for the purpose of correcting positional skew caused by hand shake in the plurality of range images generated through the bracket shooting of parallax images, the order in which steps S101 and S102 are executed is not particularly limited, and those steps may be executed in the reverse order.

In step S101, the control unit 107 generates a pan-focus image by carrying out control for shooting an image with pan focus. The "pan-focus image" is an image having a deep depth of field, so that both objects far from and near to the image capturing apparatus 100 are in focus. For pan-focus shooting, the optical system control unit 104 narrows the aperture of the optical system 101 so that the opening is narrower than that used in the shooting in step S102, described later. A set of parallax images (the A image and the B image and the mixed image can be obtained through the pan-focus shooting.

In step S102, the control unit 107 carries out control to open the aperture for the purpose of rangefinding and generate a plurality of sets of parallax images through continuous bracket shooting. At this time, the range image calculation unit 103 generates a range image corresponding to each set of parallax images generated through the corresponding bracket shooting. The present embodiment will describe a case of focus bracket continuous shooting, where bracket shooting is carried out while the optical system control unit 104 changes the focus (the in-focus position).

The control unit 107 may change the focus from the infinity end toward the near end, or from the near end toward the infinity end. The bracket focus may be changed in uniform or non-uniform steps. For example, the control unit 107 may set the steps for changing the bracket focus taking into account the span in which rangefinding is possible in the depth direction at each of subject in-focus distances, which will be described later. Increasing the size of the step for change makes it possible to reduce the number of overlapping spans in the spans in which rangefinding is possible and therefore reduce the number of instances of bracket continuous shooting.

Note that the "subject in-focus distance" refers to the distance at which the defocus amount of a subject is 0 when the subject is present at that distance. Accordingly, the subject in-focus distance is not necessarily the same as the distance at which the subject is actually present at the time of shooting.

Additionally, the control unit 107 may set the focus bracket by carrying out image analysis on an image shot separately (e.g., one of the plurality of parallax images or the mixed image obtained in step S101). The control unit 107 detects one or more subject regions in the image through the image analysis. Then, the control unit 107 may carry out bracket shooting in sequence by changing the focus through rangefinding using an AF mechanism (not shown) so as to bring the subject regions into focus in order according to a priority order (see Japanese Patent Laid-Open No. 2016-99322). Alternatively, the control unit 107 may calculate a plurality of subject regions and depth distances thereof through image analysis using deep learning or the like. The control unit 107 may carry out the bracket shooting at unequal intervals so as to cover only the subject in-focus distances corresponding to the calculated depth distances of the plurality of subjects. Alternatively, the user may select a subject through a GUI of the image capturing apparatus 100, and the control unit 107 may then carry out the bracket continuous shooting for only the subject in-focus distances of several subjects of interest.

The image capturing unit 102 generates a plurality of parallax images (a single set of parallax images) each time a single bracket is shot in the continuous shooting. The range image calculation unit 103 generates a single range image from a single set of parallax images.

Figure 4:
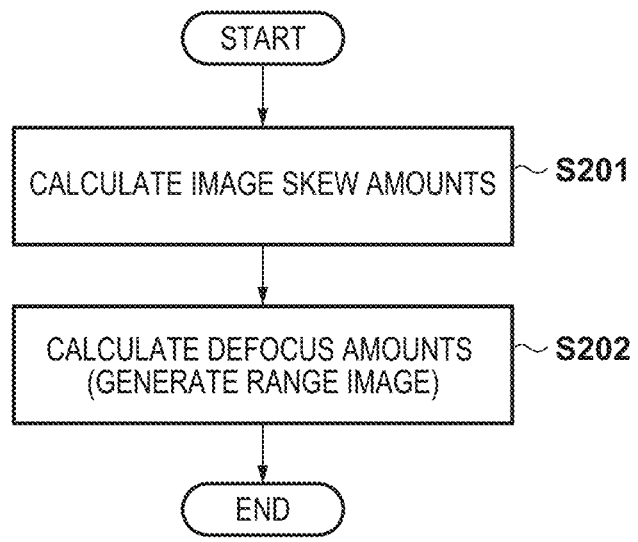
FIG. 4 is a flowchart illustrating a process for generating a range image from a set of parallax images.

The process through which a range image is generated from a set of parallax images will be described here with reference to FIG. 4. In step S201, the range image calculation unit 103 calculates an image skew amount among the plurality of parallax images included in the set of parallax images. The present embodiment will describe an example in which the pixels have the structure illustrated in FIG. 2D (i.e., when the set of parallax images includes two parallax images, namely the A image and the B image). The range image calculation unit 103 calculates the image skew amount, which is the amount of relative positional skew between the A image and the B image. A known method can be used to calculate the image skew amount. For example, the range image calculation unit 103 uses the following Expression 1 to calculate a relative value S(r) from image signal data A(i) and B(i) of the A image and the B image, respectively.

$$S(r) = \sum_{i=p}^{q} |A(i+r) - B(i)| \quad (1)$$

Here, r represents a relative image shift amount between the two images; S(r) represents a correlation value indicating a degree of correlation between the two images at the image shift amount r; and i represents a pixel number p and q represent a target pixel span used when calculating the correlation value S(r) The image skew amount can be calculated by finding the image shift amount r that gives the correlation value S(r) the lowest value.

Note that the method for calculating the image skew amount is not limited to the method described in the present embodiment, and another known method may be used instead. The method of Expression 1 calculates the absolute values of differences between luminance values or color values and then finds the sum thereof, and is known as the Sum of Absolute Difference (SAD) technique. The Sum of Squared Difference (SSD) and Normalized Cross-Correlation (NCC) techniques are known as examples of other methods. Zero-mean Normalized Cross-Correlation (ZNCC) is also a known method. An image skew amount map can be obtained by calculating the image skew amounts among all the images.

The correlation value S(r) is an extremely low value, near zero, when the two images match, and increases as the correlation between the two images decreases. A value based on the correlation value S(r) can also be used as a reliability of the distance value by using the inverse of the correlation value S(r), normalizing the correlation value S(r), or the like.

In Expression 1, when A(i) is associated with the A image and B(i) is associated with the B image, an image skew amount map, formed from parallax values taking the viewpoint of the B image as a reference, is obtained. Conversely, when A(i) is associated with the B image and B(i) is associated with the A image, an image skew amount map, taking the viewpoint of the A image as a reference, is obtained. It is necessary to apply a viewpoint conversion process, described later, to the parallax images in order to obtain an image skew amount map in which the viewpoint matches that of the mixed image.

When obtaining a pair constituted by an image and a range image, there are situations where the user wishes to change the image to be associated with the range image, in light of timing or focus differences or, when carrying out hand-held shooting, the image composition, hand shake, motion blur, and so on. Furthermore, as will be described later, if hand shake occurs during hand-held shooting, the integration of the range images will be impacted by a reference image, among the range images corresponding to the respective brackets, on which the positional skew correction is based. For example, if the image skew amount map is obtained through Expression 1 using the viewpoint of the B image as a reference, a range image from the viewpoint of the mixed image can be obtained with ease by using a known viewpoint conversion method called "view morphing". If necessary, refer to the following document for details on view morphing: "View Morphing", Proc. SIGGRAPH 96, pp. 21-30.

As described with reference to FIG. 2F, the viewpoint at Which the exit pupil 230 is seen from the image side is determined by the centroid positions of the light beams forming the respective parallax images. As such, in a stereo configuration having the A image and the B image, for example, the viewpoint of the mixed image is determined by the centroid position of the sum of the light beams, and is therefore a midpoint between the viewpoint of the A image and the viewpoint of the B image, i.e., is located on the optical axis. Accordingly, applying a pixel shift to the image skew amount of the image skew amount map through view morphing by using a half-value of the obtained image skew amount map as a motion vector makes it possible to obtain a range image which is both geometrically correct and has the viewpoint of the mixed image.

Although the present embodiment describes an example of calculating the image skew amount, calculating the image skew amount map, and converting the viewpoint of the image skew amount map using the dual-division pixel structure illustrated in FIG. 2D as an example, the same method can be applied to the quad-division structure illustrated in FIG. 2E, or to an even higher number of divisions.

Next, in step S202, the range image calculation unit 103 calculates a defocus amount, which is range information, from the image skew amount. As illustrated in FIG. 2A, the image of the subject 150 is formed on the image sensor 203 via the image forming optical system 201. FIG. 24 illustrates a state in which the light beams passing through the exit pupil 230 are focused at an image forming plane 207, and the focal point is defocused as a result. "Defocused" refers to a state where the image forming plane 207 and the image capturing surface (the light-receiving surface) do not coincide, such that a shift occurs in the direction of the optical axis 202. The defocus amount indicates the distance between the image capturing surface and the image forming plane 207 of the image sensor 203.

Figure 5:
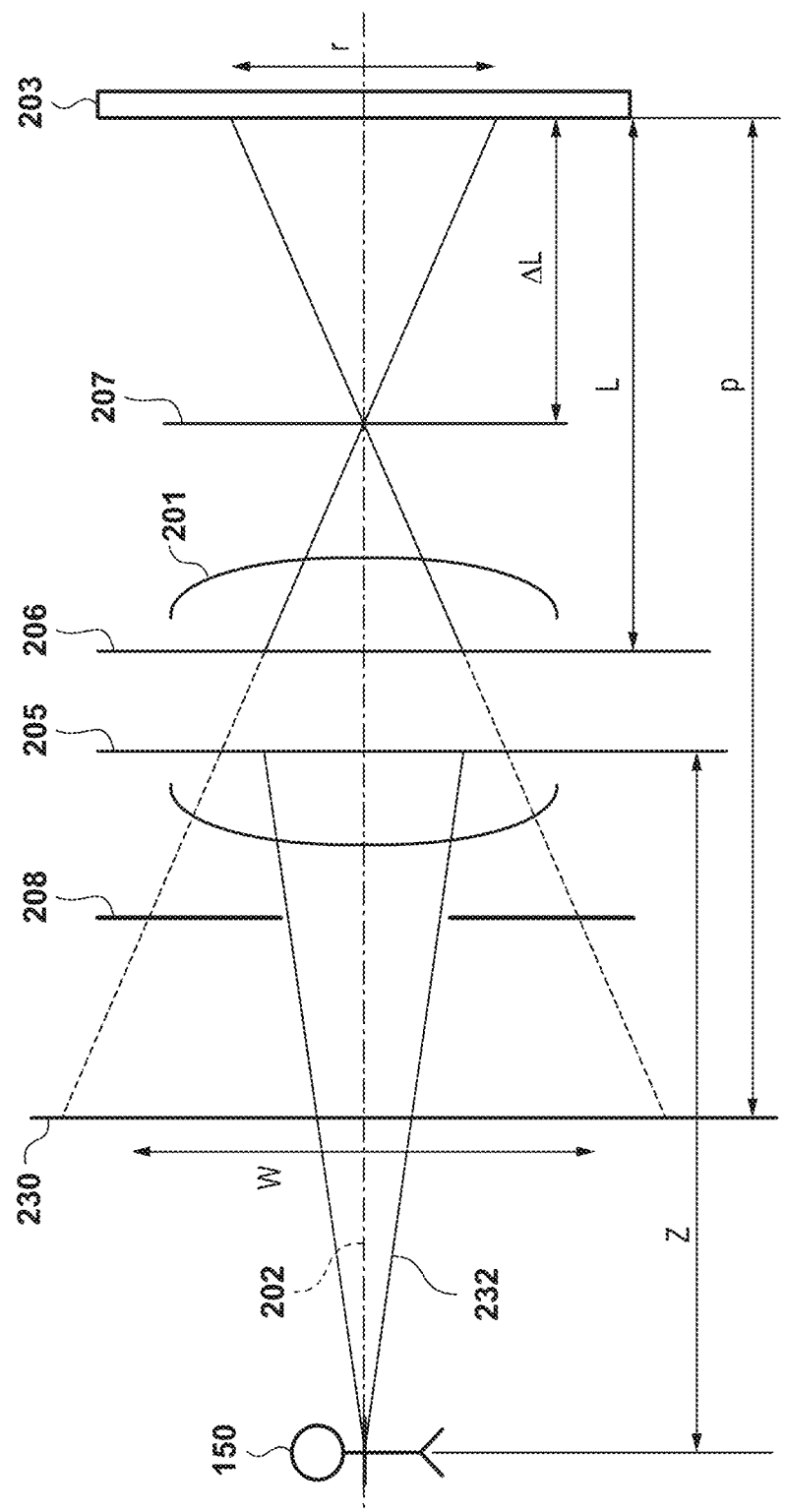
FIG. 5 is a diagram illustrating a method for converting a defocus amount into a distance value.

Here, an example of a method for converting the defocus amount into a distance value will be described with reference to the optical arrangement of the image capturing apparatus, which is illustrated in a simplified manner in FIG. 5, FIG. 5 illustrates light beams 232 in a state where the subject 150 is defocused with respect to the image sensor 203, where 202 represents the optical axis, 208 represents a diaphragm aperture, 205 represents a front-side principle point, 206 represents a rear-side principle point, and 207 represents the image forming plane. Furthermore, r represents the image skew amount; W, the baseline length; p, the distance between the image sensor 203 and the exit pupil 230; Z, the distance between the front-side principle point 205 of the image forming optical system 201 and the subject 150; L, the distance from the image sensor 203 (the image capturing surface) to the rear-side principle point 206; and ΔL, the defocus amount.

In the present embodiment, the distance Z of the subject 150 is calculated on the basis of the defocus amount ΔL. The defocus amount ΔL and the image skew amount r, which indicates the relative positional skew between the A image and the B image obtained by the respective photoelectric conversion units in the pixel 210, are related as indicated by the following Expression 2.

$$\Delta L = \frac{rL}{W - r} \quad (2)$$

Using a proportionality coefficient K, Expression 2 can be simplified as Expression 3.

$$\Delta L \cong K \cdot r \quad (3)$$

A coefficient that converts the image skew amount into a defocus amount is called a "conversion coefficient". "Conversion coefficient" refers to the aforementioned proportionality coefficient K or baseline length W. Correcting the baseline length W is the same as correcting the conversion coefficient. Note that the method for calculating the defocus amount is not limited to the method of the present embodiment, and another known method may be used instead.

The conversion from the defocus amount to the subject distance can be carried out using Expression 4, which pertains to an image forming relationship between the image forming optical system 201 and the image sensor 203. Alternatively, the image skew amount may be directly converted to a subject distance using the conversion coefficient.

$$\frac{1}{Z} = \frac{1}{f} - \frac{1}{L - \Delta L} \quad (4)$$

Here, f represents the focal distance.

By finding the defocus amount for all of the pixels, for example, between the plurality of input parallax images (e.g., between the A image and the B image), a defocus map corresponding to an input image can be calculated. By converting the defocus map according to the relationship indicated by Expression 4, a corresponding range image can be calculated.

The range image can be calculated from a plurality of parallax images obtained in a single shot (a single set of parallax images) through the rangefinding computation process described thus far.

An approximation for the depth of field of the optical system 101 can be given through the following Expressions 5 and 6.

$$\Delta L_{DOF\_F} = \frac{F\delta l^2}{f^2 + F\delta l} \quad (5)$$

$$\Delta L_{DOF\_R} = \frac{F\delta l^2}{f^2 - F\delta l} \quad (6)$$

Here, $\Delta L_{DOF\_F}$ represents a forward depth of field; $\Delta L_{DOF\_R}$, a rear depth of field; f, the focal distance; F; the aperture value; l, the subject in-focus distance; and δ, a permissible circle of confusion diameter. The permissible circle of confusion diameter δ is determined by the size of the pixels in the image capturing unit 102 and the like. On the other hand, the range is calculated from the image skew amount found from the correlation between the images as described above. Accordingly, the span in which rangefinding is possible can be defined in light of the fact that the correlation computation becomes difficult once the image has blurred by n times the permissible circle of confusion diameter δ.

When l is taken as the subject in-focus distance, a front-side span in which rangefinding is possible $L_{DML\_F}$ and a rear-side span in which rangefinding is possible $L_{DML\_R}$ can be expressed through the following Expressions 7 and 8.

$$\Delta L_{DML\_F} = l + \frac{Fn\delta l^2}{f^2 + F\delta l} \quad (7)$$

$$\Delta L_{DML\_R} = l + \frac{Fn\delta l^2}{f^2 - F\delta l} \quad (8)$$

Figure 6A:
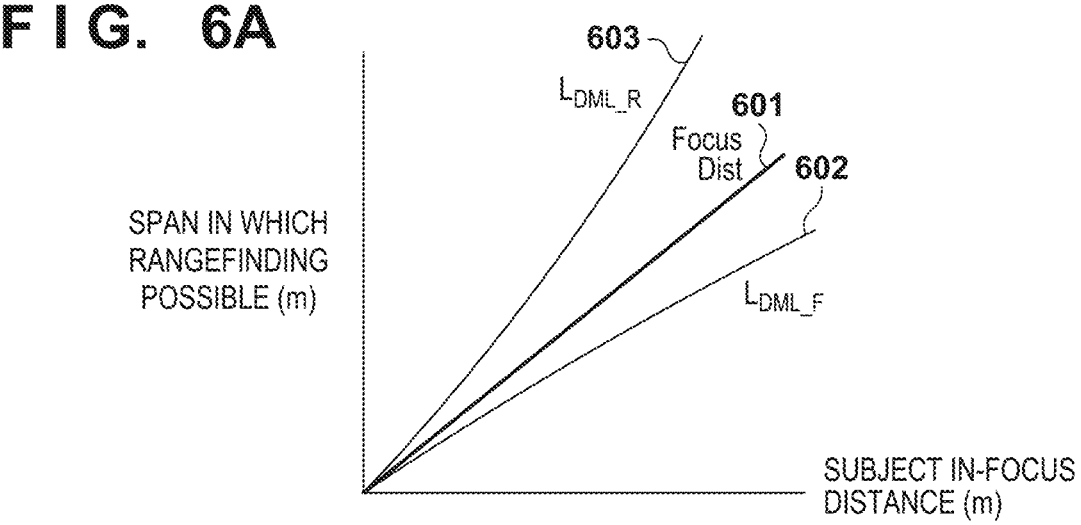
FIGS. 6A to 6C are diagrams illustrating a relationship between a subject in-focus distance and a span in which rangefinding is possible.

The range span in which rangefinding is possible of the pupil division optical system is a range span from $L_{DML\_F}$, on the forward side of the subject position, to $L_{DML\_R}$, on the rear side, with respect to the subject in-focus distance 1. For example, the focal distance f, aperture value F, and permissible circle of confusion diameter δ of the optical system 101, and a magnification n for the blur at which the rangefinding correlation can be achieved, are set to specific values. This makes it possible to draw three graphs, i.e., a subject in-focus distance 601, a front-side span in which rangefinding is possible 602, and a rear-side span in which rangefinding is possible 603, as illustrated in FIG. 6A, for example. The horizontal axis represents the subject in-focus distance 1, and the vertical axis represents the ranges of the front-side span in which rangefinding is possible 602 and the rear-side span in which rangefinding is possible 603 corresponding to the subject in-focus distance 1. Both the horizontal axis and the vertical axis correspond to the subject in-focus distance 1 for the subject in-focus distance 601. To simplify the graphs, the vertical axis and the horizontal axis use different scales.

Figure 6B:
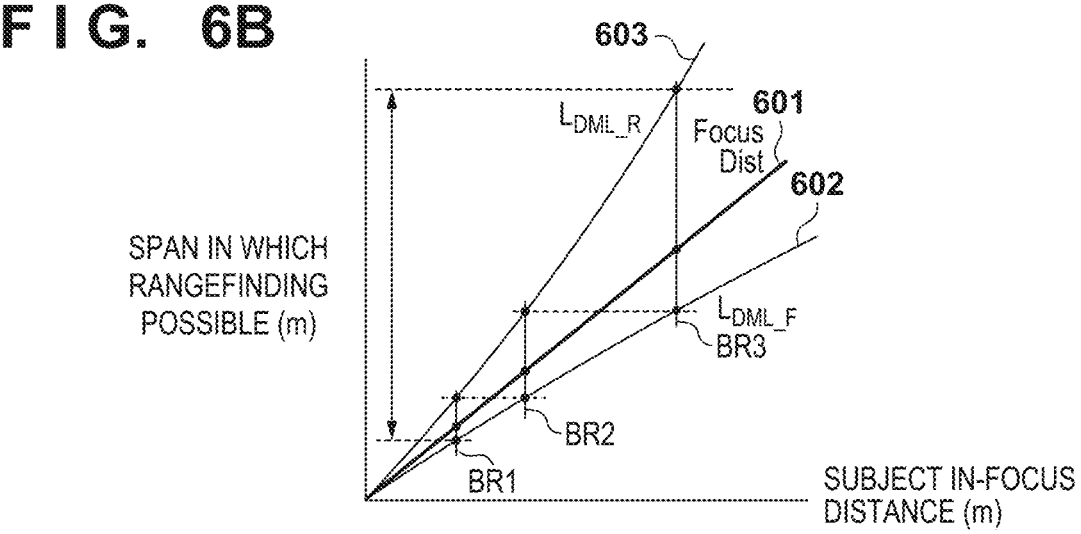

FIG. 6B is a diagram illustrating an example of focus bracket continuous shooting settings. The bracket steps can be shifted extensively as long as doing so does not produce gaps in the span in which rangefinding is possible defined by the relationship between the front-side span in which rangefinding is possible $L_{DML\_F}$ and the rear-side span in which rangefinding is possible $L_{DML\_R}$. For example, even if three bracket shots are taken while keeping the overlap between spans in which rangefinding is possible as low as possible as illustrated in FIG. 6B, rangefinding is possible over the entire space of a subject having a broad range span with respect to the depth direction.

If the Depth From Defocus (DFD) technique is used, the range is found by analyzing slight differences in how the blur changes, making it necessary to make the bracket steps smaller and thus increasing the necessary number of shots. In many cases, using the technique of the present embodiment makes it possible to increase the size of the bracket steps, and thus reduce the number of shots taken, as compared to when using the DFD technique.

Figure 7A:
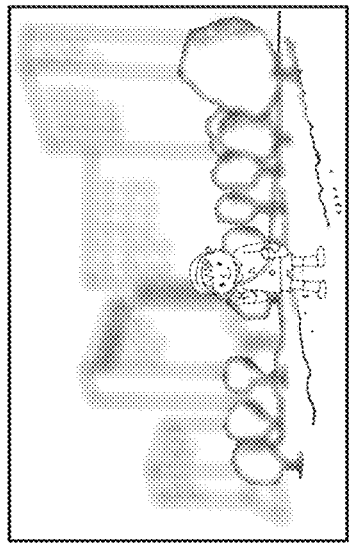
FIGS. 7A to 7D are diagrams illustrating examples of mixed images obtained through pan-focus shooting and focus bracket continuous shooting.
Figure 7B:
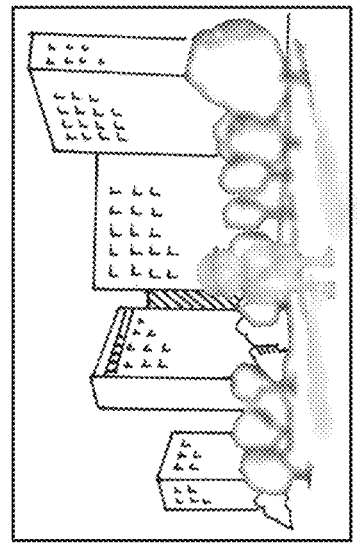
Figure 7C:
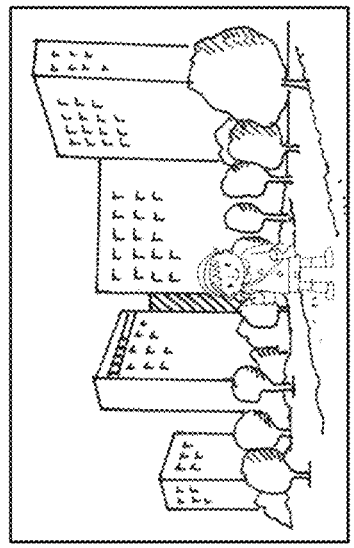
Figure 7D:
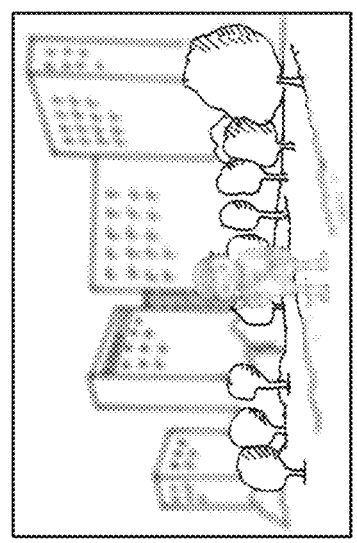
Figure 8C:
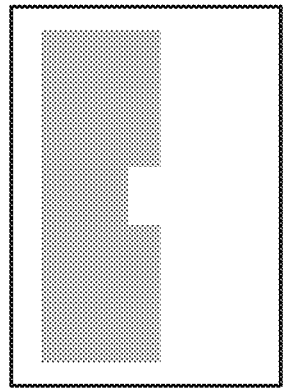
FIGS. 8A to 8E are diagrams illustrating examples of range images and integrated range images.
Figure 8B:
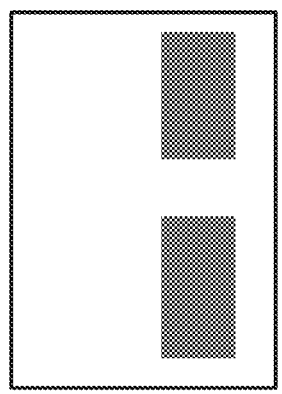
Figure 8E:
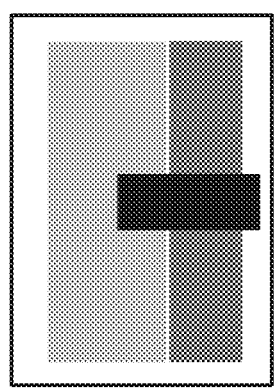
Figure 8A:
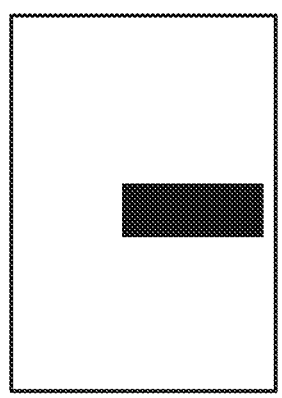

FIG. 7A illustrates a mixed image obtained by shooting a scene including a figurine and a miniature garden through pan-focus shooting. FIGS. 7B, 7C, and 7D illustrate mixed images obtained from focus bracket continuous shooting corresponding to the three settings of BR1, BR2, and BR3, respectively, indicated in FIG. 6B. FIGS. 8A, 8B, and 8C are range images generated from sets of parallax images corresponding to the mixed images illustrated in FIGS. 7B, 7C, and 7D. The white regions in the range images represent regions outside the span in which rangefinding is possible, from which distance values could not be obtained. Of the regions having a tone, distant regions are expressed by higher (brighter) tones, and nearby regions are represented by lower (darker) tones. Because the spans in which rangefinding is possible in the depth direction differ from bracket to bracket, there are no common subject region distance values among the range images in FIGS. 8A, 8B, and 8C. Note that even if the size of the bracket steps is reduced to create overlap among the spans in which rangefinding is possible in the depth direction, there may still be situations where, in the subject space, the subjects are present at discrete regions with respect to the depth direction and a subject is therefore not present in a depth-direction span corresponding to the overlap between the spans in which rangefinding is possible of respective brackets. In this case, too, there are no common subject region distance values among the range images.

When the image capturing apparatus 100 is at rest (e.g., when the image capturing apparatus 100 is attached to a tripod), the integrated range image can be generated simply by compositing the range images illustrated in FIGS. 8A, 8B, and 8C.

Figure 8D:
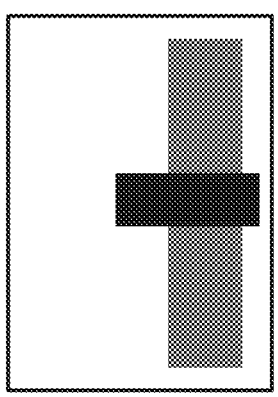

Step S103 in FIG. 3 is a step in which the integrated range image is generated by integrating the range images generated in step S102. When there is no regional overlap from bracket to bracket within the angle of view of the range images, the integrated range image is generated by simply superimposing the range images. FIGS. 8D and 8E are diagrams illustrating an example of sequentially integrating range images generated through bracket continuous shooting. FIG. 8D is a range image obtained by integrating the images illustrated in FIGS. 8A and 8B, which are range images corresponding to brackets BR1 and BR2, respectively. FIG. 8E is a range image obtained by integrating the images illustrated in FIGS. 8A, 8B, and 8C, which are range images corresponding to brackets BR1, BR2, and BR3, respectively. In a case such as where the image capturing apparatus 100 is attached to a tripod, a range image having a broad rangefinding span in the depth direction, and in which the entire desired region of the subject space in the depth direction has been measured, can be obtained simply by compositing the range images.

If the overlapping range parts have been obtained, a new distance value providing a higher level of accuracy, reliability, and so on can be obtained through a statistical process such as averaging. Alternatively, if rangefinding values are obtained simultaneously for the same location among a plurality of range images, a complex heuristic algorithm can be used, such as using a range image value created from the defocus closest to the subject in-focus distance (the minimum defocus). A value that satisfies both the defocus closest to the subject in-focus distance and the subject in-focus distance that is most distant can also be employed. Conversely, the closer subject in-focus distance (the minimum subject in-focus distance) may be selected if a distance value in the rear-side rangefinding span is to be prioritized. Furthermore, range images corresponding to a part of bracket images with respect to which a correlation value, reliability, or spatial frequency between parallax images of a part is similar to or exceeding that of a corresponding part of the pan-focus image at the same location, may be selected and used.

However, if the image capturing apparatus 100 is held in the user's hand and hand shake has occurred during the bracket continuous shooting, the hand shake will produce skew in the position/attitude relationship of the image capturing apparatus 100 from bracket to bracket in the continuous shooting. The amount of skew in the position and attitude of the image capturing apparatus 100 caused by this hand shake movement (called simply a "positional skew amount" hereinafter) is calculated by the positional skew correction unit 105. The positional skew amount is calculated using the pan-focus image shot in step S101 as a guide image. Furthermore, the positional skew amount is calculated between one of the plurality of parallax images or the mixed image obtained when shooting the pan-focus image, and one of the plurality of parallax images or the mixed image obtained when shooting the range image. It is preferable that the positional skew amount be calculated on the basis of the positional skew between the parallax images from corresponding division locations, or between the mixed images.

FIG. 9 is a diagram illustrating an example of the relationship between the plurality of parallax images shot in steps S101 and S102 and the mixed image. The dual-division example illustrated in FIG. 2D is used here. In pan-focus shooting, when the aperture of the optical system 101 set by the optical system control unit 104 has been greatly reduced and the F-stop value is high, there are cases where a range image cannot be generated. The range image corresponds to the viewpoint in one of the parallax images or in the mixed image. On the other hand, the parallax images and the mixed image have different viewpoints, as described with reference to FIG. 2F.

When calculating the positional skew amount, the positional skew amount is found using the parallax images at corresponding division locations, or using the mixed images, between brackets or between the pan-focus image and one of the brackets. If, for example, the positional skew amount is found between parallax images at different division locations or between a discrete parallax image and the mixed image, and that positional skew amount is then used to integrate the range images, the range images cannot be integrated correctly.

It is furthermore necessary to generate the range images in each bracket so that the viewpoint positions are uniform. Otherwise, it will be necessary to carry out viewpoint conversion for one of the range images so that the range images will have the same viewpoint position between the brackets when the range images are integrated. When selecting an image for calculating the distance value (correlation value) through Expression 1, it is preferable that the division positions of the images be made uniform between the brackets. Alternatively, it is preferable to carry out viewpoint conversion to the viewpoint position of the mixed image from each.

Furthermore, as described with reference to FIG. 2F, in a pupil division image capturing system, the viewpoint position of each parallax image is determined by the centroid position of the light beam passing through the pupil region of the optical system 101. As such, the baseline length 262 will also vary depending on the state of the aperture, focus, and so on set by the optical system control unit 104. On the other hand, the mixed image corresponds to the sum of the light beams passing through the pupil region of each parallax image, and thus the viewpoint position is always present on the optical axis. In other words, when the aperture and focus are the same, the relationship between the viewpoint position of each parallax image and the viewpoint position of the mixed image holds constant even if hand shake is imparted on the image capturing apparatus 100. However, if the aperture or focus is changed during bracket continuous shooting, the relationship between the viewpoint position of each parallax image and the viewpoint position of the mixed image will change.

Accordingly, it is preferable that the viewpoint position of the mixed image be used as a reference when estimating the positional skew amount between brackets in focus bracket continuous shooting and when estimating the positional skew amount between each bracket and the pan-focus image used as a guide image.

For example, when a pair constituted by a pan-focus image and an integrated range image is ultimately to be obtained, it is preferable that the positional skew amount be calculated using the mixed image from the pan-focus shooting, and the mixed image from each instance of the bracket shooting of parallax images, as a reference. Doing so is efficient because there is no need to carry out needless viewpoint conversion for the positional skew amount. Additionally, the same generation methods are used, namely having the range image of each bracket correspond to the viewpoint of the A image, the viewpoint of the B image, or the viewpoint of the mixed image. When the range image is generated using the viewpoint of the A image or the viewpoint of the B image, it is necessary to convert the range image viewpoint to the viewpoint of the mixed image after the integration. As such, it is preferable that the viewpoint of the range images be aligned with the viewpoint of the mixed image at the time of generation for each bracket.

If the positional skew amount is calculated directly between respective bracket images, changes in the focal position produced by focus bracketing will result in the images blurring in different ways. This makes it extremely difficult to achieve associations between the brackets, which in turn makes it difficult to calculate the positional skew amount between brackets. Several methods are conceivable for addressing this issue, such as carefully considering the differences in blur between images that blur in different ways to compensate for those differences and make the association, using a deblurring process to cancel and adjust the blur and then make the association, and so on, but such methods are difficult to implement. Accordingly, a method will be described in which first, the positional skew amount between each bracket image and the pan-focus image is calculated and converted, and the positional skew amount is then calculated between each bracket image. Then, an image that indicates image changes caused by defocus is created by adding blur to the pan-focus image, which is then associated with an image containing blur for the purpose of rangefinding shooting; the positional skew amount is then calculated.

Figure 10:
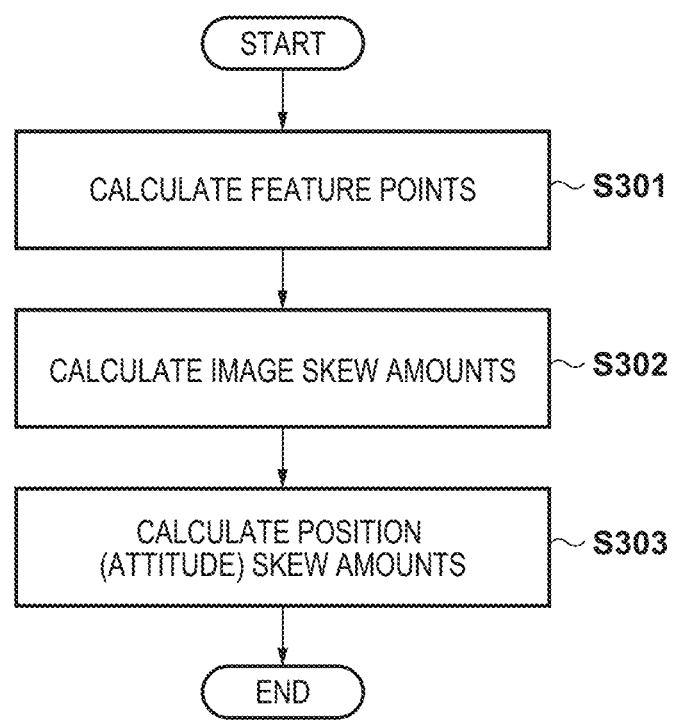
FIG. 10 is a flowchart illustrating a process for calculating an amount of positional skew between a pan-focus image (a guide image) and each of bracket images.

FIG. 10 is a flowchart illustrating a situation where the amount of positional skew between a pan-focus image (a guide image) and each of bracket images is repeatedly calculated. In step S301, the positional skew correction unit 105 detects feature points or edges in the pan-focus image. A method in which feature point or edge extraction, such as SIFT or SURF, is used, and the extracted feature points in the respective images are associated with each other, is known as a method for calculating the positional skew amount between the images. However, the image for rangefinding is shot having opened the aperture in order to improve the rangefinding performance, and the depth of field is therefore shallow. As such, it is likely that the subject image in each of the images is blurred due to defocus, which means that it is often difficult to extract feature points, edges, or the like. Using a region-based association method as the method for calculating the positional skew amount thus provides a higher level of stability. However, if a region-based association method is applied to regions where there are no features, edges present only in one direction, and the like; the association is difficult and will often be pointless. The positional skew correction unit 105 therefore extracts feature points or edges in the pan-focus image so that only corner points, image regions corresponding to edge parts, and so on, which are favorable for the association, are used in the association.

Feature point extraction using the Harris operator will be described here as an example of the feature point extraction. Extracting corner positions of an image as feature points suppresses aperture problems, so-called "slippage" problems, and so on when selecting and searching positions lacking appropriate features using a region-based method, and makes it possible to improve the searchability rate, reduce the rate of outliers, and improve the accuracy.

With the Harris operator, first, a window size W is set, and a differential image $(I_{dx}, I_{dy})$ is calculated in the horizontal and vertical directions. A Sobel filter or the like may be used to calculated the differential image. For example, a 3×3 filter $h_x$, set to h=[1, √2, 1]/(2+√2) in the horizontal direction and arranged three times in the vertical direction, and a 3×3 filter $h_y$, set to h in the vertical direction and arranged three times in the horizontal direction, is applied to obtain $(I_{dx}, I_{dy})$.

Then, using the window size W, a matrix G is calculated according to Expression 9 for all of coordinates (x,y) in the image.

$$G = \begin{bmatrix} \sum_W I_x^2 & \sum_W I_x I_x \\ \sum_W I_x I_x & \sum_W I_y^2 \end{bmatrix} \quad (9)$$

Feature points are extracted in order from the coordinates (x,y) in the matrix G having the minimum singular value. At this time, it is preferable that the feature points not be too densely located. Accordingly, restrictions may be put into place, such as not calculating any more feature points in the periphery of the window size W of coordinates (x,y) for which feature points have already been extracted. 200 to 300 feature points are extracted for the pan-focus image, for example.

Figure 11:
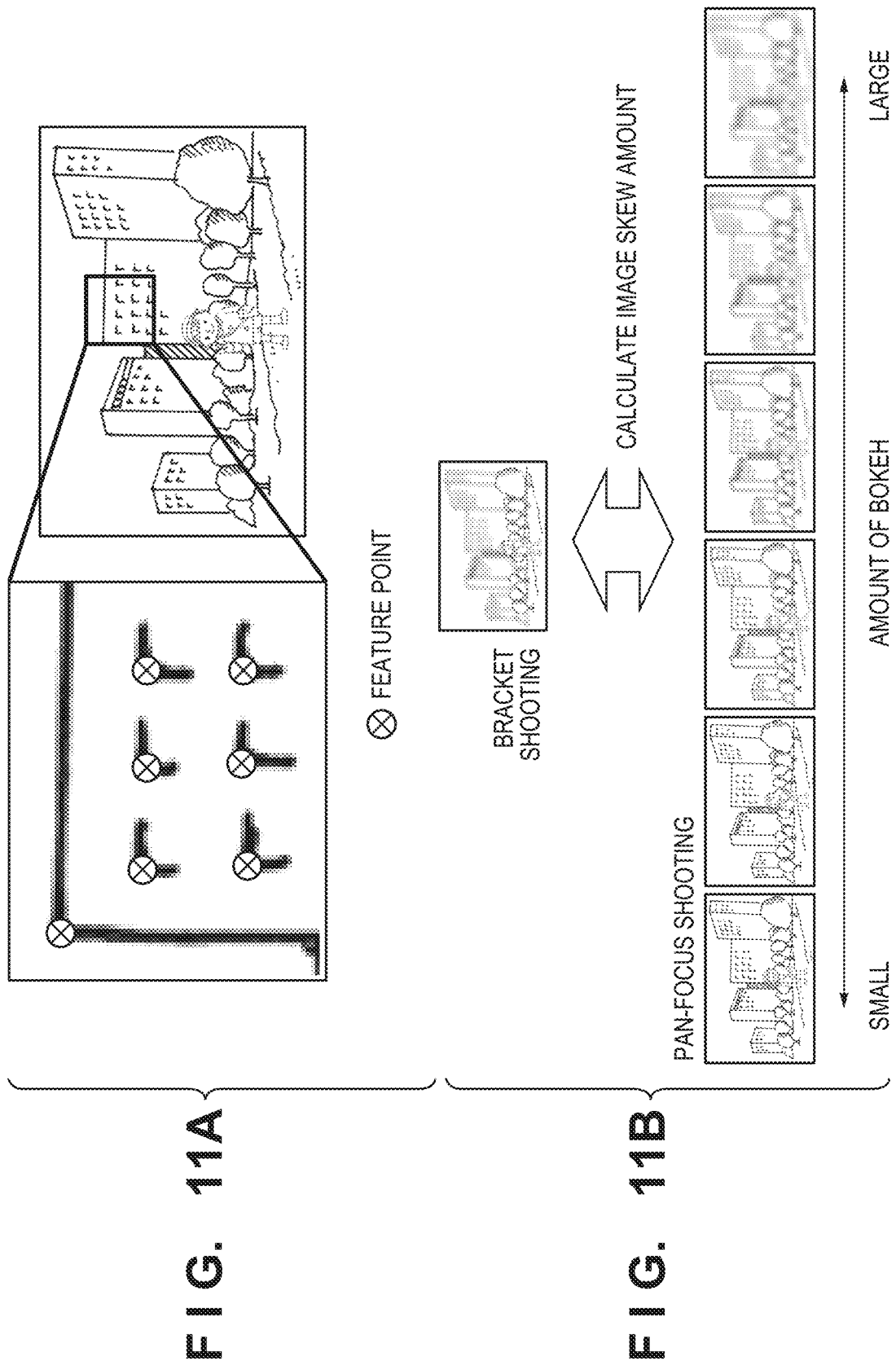
FIG. 11A is a diagram illustrating an example of the extraction of feature points in a pan-focus image.
FIG. 11B is a diagram illustrating an example of an image bank of blurred images with respect to a pan-focus image.

FIG. 11A illustrates an example of the extraction of feature points in the pan-focus image. Note that the feature point extraction method is not limited to the method described in the present embodiment, and another known method may be used, including an advanced feature point extraction method such as SIFT, SURF, or the like. Furthermore, edges may be extracted instead of extracting feature points.

In step S302, the positional skew correction unit 105 calculates the image skew amounts between the pan-focus image and each bracket image at the feature point positions calculated in the pan-focus image. The positional skew correction unit 105 handles the vicinity of the feature point positions set in the pan-focus image as patches, and calculates, as the image skew amount, a two-dimensional motion vector corresponding to the positional displacement within each bracket image. The image patch may be a color image or luminance image. For the sake of simplicity, the present embodiment will employ a luminance image.

For example, Expression 10, which extends Expression 1 for the two-dimensional image shift, can be used in the calculation of the image skew amount.

$$S(r, s) = \sum_{j=t}^{u} \sum_{i=p}^{q} |A(i+r, j+s) - B(i, j)| \quad (10)$$

Here, r and s represent the relative horizontal and vertical direction image shift amounts of two images; S(r,s), a correlation value between the two images under the two-dimensional image shift amount (r,s); and i and j, pixel numbers, p and q, and t and u, represent a target pixel span used when calculating the correlation value S(r,s). The image skew amount for each individual feature point can be calculated by finding the image shift amount (r,s) that gives the correlation value S(r,s) the lowest value.

Note that as with Expression 1, the method for calculating the image skew amount is not limited to the method of the present embodiment, and another known method may be used instead.

However, a pan-focus image shot using a narrow aperture, and each bracket image shot with a wide aperture for use in rangefinding computations, are blurred in different ways. As such, there are situations where the correct skew amount cannot be calculated through a simple correlation computation such as that indicated by Expression 10.

Accordingly, the positional skew correction unit 105 creates an image bank by using a blur kernel in which the kernel size is varied little by little to apply an image blurring process to the pan-focus image.

FIG. 11B illustrates an example of the image bank of blurred images with respect to the pan-focus image. Although smaller steps are better for the steps of changing the kernel size, using smaller steps also increases the amount of memory, the amount of correlation processing, and so on based on the number of images in the bank. It is sufficient simply to obtain a similar blurred image from which a correlation for calculating the positional skew amount can be found, and thus the kernel size is changed in steps corresponding to the pixel size, for example. In addition, the kernel size may be changed from a size of 0, which corresponds to an ideal focus state, to a kernel size corresponding to the blur at the depth of field of forward blur or rear blur which define the limits of the rangefinding. In other words, the maximum kernel size is defined on the basis of a blur size that is n times the permissible circle of confusion diameter δ which defines the spans in which rangefinding is possible $L_{DML\_F}$ and $L_{DML\_R}$. Then, the image skew amount is calculated between each of the blurred images in the image bank, and each of the bracket images which are subject to image skew calculation. In other words, when an image number in the image bank is taken as k, the computation indicated by the following Expression 11 is carried out.

$$S(r, s, k) = \sum_{j=t}^{u} \sum_{i=p}^{q} |A(i+r, j+s) - B_k(i, j)| \quad (11)$$

Here, $B_k$ represents an image k in the image bank for which the blur has been changed with respect to the pan focus image, and A represents the bracket image for which the image skew amount is calculated. The association is carried out for all the images in the image bank, and the position (r,s) in the image k in the image bank having the lowest residual score is taken as the image skew amount pertaining to the corresponding feature point (see Expression 12).

$$\arg\min_{r,s,k} S(r, s, k) \quad (11)$$

This search is carried out between the guide image and the bracket images selected for calculating the positional skew amount, a number of times equivalent to the number of feature points extracted in the pan focus image. By doing so, an image skew amount (r,s) map is obtained, in which two-dimensional image skew amounts have been sparsely calculated with respect to the feature point positions. Additionally, when calculating the image skew amount, the magnitude of a defocus amount with an unknown sign can be known from an index k of the blurred image bank at that feature point position. The image skew amount is less reliable at feature point positions where the defocus amount is high. The defocus amount may be used as a weight in a weighted calculation carried out in the next step.

In step S303, the positional skew correction unit 105 calculates a relative position/attitude during each instance of bracket shooting with respect to the position/attitude of the image capturing apparatus 100 during the pan-focus image shooting, from the map of the image skew amounts at the feature point positions calculated in step S302. The image skew amount map expresses skew amounts of the feature points in the corresponding bracket image, taking the pan-focus image as a reference. Accordingly, a change in the relative position/attitude of the image capturing apparatus 100 is found by once again returning the image skew amount map to the corresponding point coordinates of the feature points on the pan-focus image and the corresponding bracket image.

The positional skew correction unit 105 finds a basic matrix from the corresponding point coordinates of the feature points, and then converts that matrix into change information of the relative position/attitude of the image capturing apparatus 100. For example, when the image skew amount map has been calculated using the guide image as a reference, the root coordinates of an image skew amount vector corresponds to the coordinates in the pan-focus image, and the endpoint of the vector corresponds to the coordinates of the feature point position in the corresponding bracket image.

Here, pi represents the projection of a given spatial point p onto the guide image and a given image in bracket shooting i. $K_i$ represents internal camera parameters used during pan-focus shooting and bracket shooting i. When such is the case, normalized coordinates are defined as follows. For example, assume that i=0 for pan-focus, i=1 for BR1, and i=2 for BR2.

$$\tilde{x}_i = K_i^{-1} \tilde{p}_i, \text{ where} \quad (13)$$

$$\vec{x}_i = \begin{bmatrix} x_i \\ y_i \end{bmatrix},$$

$$\vec{p}_i = \begin{bmatrix} p_i \\ q_i \end{bmatrix},$$

$$\tilde{x}_i = \begin{bmatrix} \vec{x}_i \\ 1 \end{bmatrix},$$

$$\tilde{p}_i = \begin{bmatrix} \vec{p}_i \\ 1 \end{bmatrix}$$

Here, p and q represent the image coordinates, and x and y represent the normalized coordinates.

$$K_i = \begin{bmatrix} f_i & 0 & C_x \\ 0 & f_i & C_y \\ 0 & 0 & 1 \end{bmatrix} \quad (14)$$

With focus bracket continuous shooting, the focal distance $f_i$ changes depending on the zoom state set by the optical system control unit 104. The focal distance $f_i$ is the focal distance of the optical system 101 during the pan-focus and bracket i shooting. $C_x$ and $C_y$ are the image centers, corresponding to the point of intersection between the optical axis and the image. The relative position/attitude of the image capturing apparatus 100 can be found using the corresponding points between the two normalized images.

Here, if, for example, projected image in the pan-focus shooting of i=0 at the spatial point P is taken as $p_0$, and the projected image in the bracket BR1 is taken as $p_1$, then the following holds true.

$$\vec{x}_0 = K_0^{-1} \vec{p}_0, \ \vec{x}_1 = K_1^{-1} \vec{p}_1 \quad (15)$$

Here, $x_1$ and $x_2$ satisfy the following homogeneous relationship.

$$\vec{x}_1 = R\vec{x}_0 + t \quad (16)$$

Epipolar restrictions can be denoted as follows.

$$x_1^T [t]_X R x_0 = 0 \quad (17)$$

If the basic matrix is defined as follows, $$E = [t]_X R \quad (18)$$

then the following relationship is obtained.

$$x_1^T E x_0 = 0 \quad (19)$$

E has the following properties.

$$\det E = 0 \quad (20)$$

$$2EE^T E - \text{trace}(EE^T) E = 0 \quad (21)$$

As such, a basic matrix E can be found through Expression 22 and Expression 23. Here, the suffix is an identification number not of the image index, but of the feature point and the corresponding point in the same image. The presence or absence of an apostrophe distinguishes between the pan-focus image serving as a reference and the bracket image used to find the relative position/attitude.

$$\begin{bmatrix} x'_1 x_1 & x'_1 y_1 & x'_1 & y'_1 x_1 & y'_1 y_1 & y'_1 & x_1 & y_1 & 1 \\ x'_2 x_2 & x'_2 y_2 & x'_2 & y'_2 x_2 & y'_2 y_2 & y'_2 & x_2 & y_2 & 1 \\ x'_3 x_3 & x'_3 y_3 & x'_3 & y'_3 x_3 & y'_3 y_3 & y'_3 & x_3 & y_3 & 1 \\ x'_4 x_4 & x'_4 y_4 & x'_4 & y'_4 x_4 & y'_4 y_4 & y'_4 & x_4 & y_4 & 1 \\ x'_5 x_5 & x'_5 y_5 & x'_5 & y'_5 x_5 & y'_5 y_5 & y'_5 & x_5 & y_5 & 1 \end{bmatrix} \begin{bmatrix} E_{11} \\ E_{12} \\ E_{13} \\ E_{21} \\ E_{22} \\ E_{23} \\ E_{31} \\ E_{32} \\ E_{33} \end{bmatrix} = 0_1 \quad (22)$$

$$E = \begin{bmatrix} E_{11} & E_{12} & E_{13} \\ E_{21} & E_{22} & E_{23} \\ E_{31} & E_{32} & E_{33} \end{bmatrix} \quad (23)$$

Using the definition in Expression 18, and assuming the motion between two cameras is $[I|0], [R|\vec{t}]$, decomposing the E matrix results in:

$$E = U \sum V^T \quad (24)$$

$$\sum = \begin{bmatrix} s & 0 & 0 \\ 0 & s & 0 \\ 0 & 0 & 0 \end{bmatrix}, \quad (25)$$

$$W = \begin{bmatrix} 0 & -1 & 0 \\ 1 & 0 & 0 \\ 0 & 0 & 1 \end{bmatrix},$$

$$W^{-1} = W^T = \begin{bmatrix} 0 & 1 & 0 \\ -1 & 0 & 0 \\ 0 & 0 & 1 \end{bmatrix}$$

R and can then be restored as follows.

$$\vec{t} = \vec{u}_3, \text{ or } \vec{t} = -\vec{u}_3 \quad (26)$$

$$R = UWV^T, \text{ or } R = UW^T V^T \quad (27)$$

Although four solutions are possible, only one has meaning. A depth positive constraint test is carried out using corresponding points to find the correct combination of solutions. Taking P=[I|0] and P'=[R|$\vec{t}$], back-projection based on the following Expression 28 using corresponding points results in:

$$\lambda x = PX \tag{28}$$

Thus a spatial point X is obtained through triangular vision (Expression 29).

$$\begin{bmatrix} P_3 x - P_1 \\ P_3 y - P_2 \\ P'_3 x' - P'_1 \\ P'_3 y' - P'_2 \end{bmatrix} X = 0 \tag{29}$$

Here, $P_i$ is a line vector of P. The combination of solutions having the highest number of positive signs at the z coordinate of the spatial point X corresponding to the obtained corresponding point is obtained as a geometrically correct solution for R, $\vec{t}$.

The relative position/attitude R and t of the image capturing apparatus 100 between a plurality of instances of image capturing can be found through the method described above. However, t obtained through this computation is a scale-free two degrees of freedom. The scale is canceled out between the spatial point X and $\vec{t}$. Because the bracket image and the range image form a pair, the scale is determined by the association with the spatial point X of the feature point position. Specifically, the feature point coordinates (x,y) in the pan-focus image correspond to the corresponding point coordinates (x',y') in the bracket image, and the bracket image is paired with the range image; as such, the distance value d in the camera matrix P'=[R|$\vec{t}$] is known. Additionally, because the coordinates of the spatial point X in the camera matrix P=[I|0], when the scale is undetermined, are known from the computation made using Expression 29, the scale λ can be determined by converting to a spatial point X" of the camera matrix P' and then comparing the z coordinate with the distance value d, Expressed as a function, this corresponds to the following Expression 30.

$$X'' = MX, \; M = [R^T | -R^T \vec{t}], \; \lambda X''_3 = d \tag{30}$$

Here, $X''_3$ is a third element of X".

Through the procedure described above, a value calculated for the relative position/attitude when any given one of the bracket images is shot can be obtained with respect to the position/attitude of the image capturing apparatus 100 at the time when the pan-focus image is shot. This processing loop is carried out for each set of parallax images from each bracket shot during continuous shooting and generated range images. As a result, the relative position/attitude of the image capturing apparatus 100 during the entire continuous bracket shooting is obtained with respect to the position/attitude of the image capturing apparatus 100 at the time when the pan-focus image is shot. The relative position/attitude can be converted into an amount of change in the position/attitude between the respective brackets in the continuous shooting by using a simple conversion process.

Figure 12:
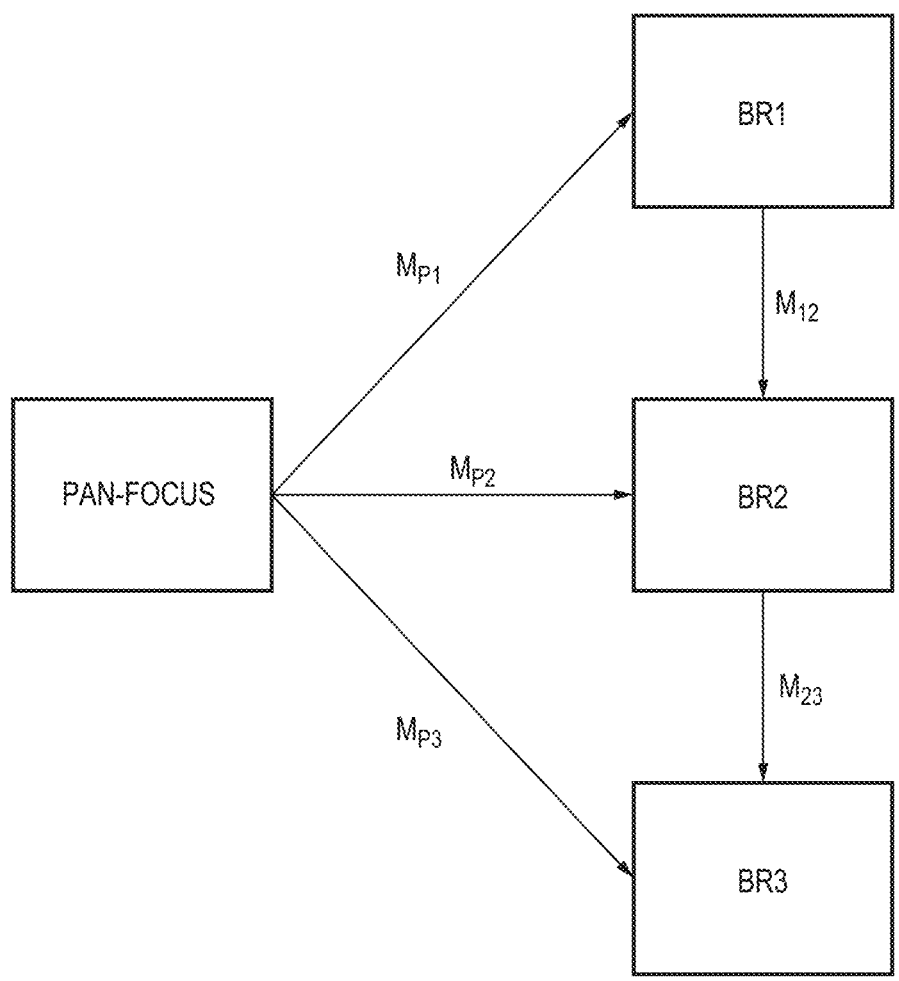
FIG. 12 is a diagram illustrating relationships between relative positions/attitudes.

FIG. 12 illustrates relationships between the relative positions/attitudes found through the computations. FIG. 12 illustrates an example in which three instances of focus bracket continuous shooting have been carried out using the focus bracket settings illustrated in FIG. 6B. $M_{ij}$ represents the relative position/attitude of the image capturing apparatus 100, and when the changes in the relative position/attitude from shooting i to shooting j are a rotation R and a translation $\vec{t}$, the following holds true:

$$M_{ij} = [R | \vec{t}] \tag{31}$$

First, relative positions/attitudes $M_{P1}$, $M_{P2}$, and $M_{P3}$ are estimated between the pan-focus image (P) and the respective bracket images (BR1,BR2,BR3, ... =1, 2, 3). When the relative positions/attitudes between the pan focus image and the continuous shooting bracket images have been found, relative positions/attitudes $M_{12}$ and $M_{23}$ can be computed between the continuous shooting bracket images. For example, $M_{12}$ can be found as follows:

$$M_{12} = M_{P2} M_{P1}^{-} \tag{32}$$

The method described thus far calculates a positional skew amount, or in other words, a change in the relative position/attitude of the image capturing apparatus 100, from the relationships between the pan-focus image and the respective bracket images. However, if the steps at which the focus brackets change are small, or subjects are arranged successively in the depth direction, common regions will be present between brackets even from range image to range image. As such, after the positional skew amount between brackets is found in a color image or a luminance image, that amount can be used as an initial value to calculate the positional skew amount three-dimensionally between the range images found in the bracket-by-bracket basis. When the positional skew amount can be calculated three-dimensionally using the range images (i.e., when the change in the position/attitude of the image capturing apparatus 100 can be calculated), that amount is found using the range images themselves, which makes it possible to achieve a higher level of accuracy, using a simple calculation, than when finding the amount from among images. Additionally, when the value calculated from the image is set as an initial value and a restriction is placed on the range of variation, changes in the position/attitude can be calculated three-dimensionally in a stable manner, without divergence, even if there are few common regions of the range images from bracket to bracket.

Figure 6C:
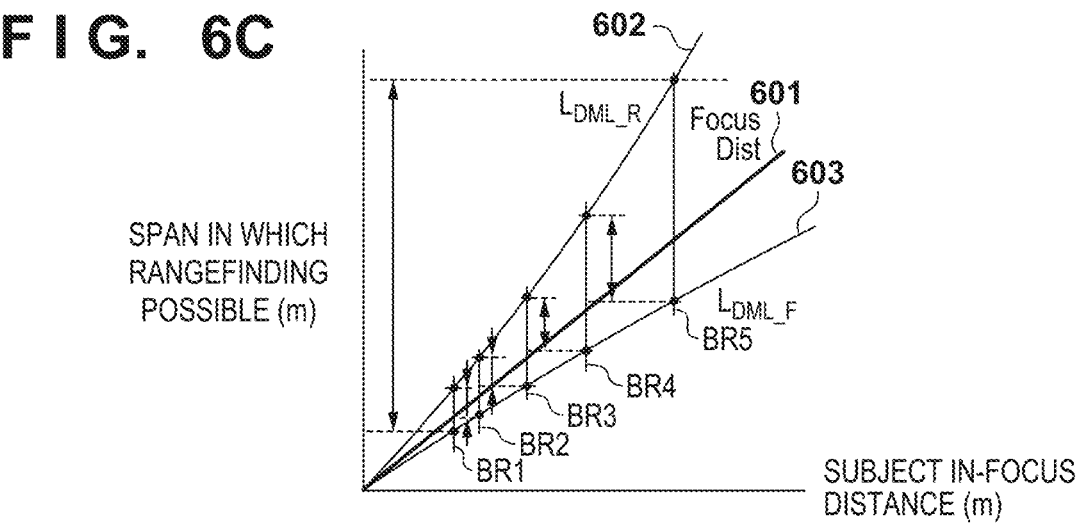

Here, the calculation of changes in the relative position/attitude of the image capturing apparatus 100 from bracket to bracket will be described assuming a case where shooting is performed by increasing the number of brackets for the rangefinding span, as illustrated in FIG. 6C. Compared to a case where there is a low number of brackets and ranges are found by setting continuous shooting brackets without providing a margin for the rangefinding span in the depth direction, as illustrated in FIG. 6B, is easier, in this case, for common depth regions to arise between range images in each of the brackets. If the subject is present in a position at a depth Where there is an overlap in the spans in which rangefinding is possible between the brackets, as illustrated in FIG. 6C, a common region will arise in the range images, which means that the three-dimensional relative position/attitude can be found directly.

A method for estimating a change in the relative position/attitude of the image capturing apparatus 100 using range image information will be described hereinafter. Here, it is assumed that an amount of change in the position/attitude between brackets in the continuous shooting has already been found from the relative position/attitude of the image capturing apparatus 100 during the entire continuous bracket shooting with respect to the position/attitude of the image capturing apparatus 100 at the time when the guide image is shot.

Here, a method will be described in which the initial values R and $\vec{t}$ of the relative position/attitude are refined by estimating the position/attitude between point groups obtained by back-projecting a range image. Assume that images have been captured for two adjacent brackets using the camera arrangement illustrated in FIG. 13A. P represents the camera matrix from the first bracket shooting, and P' represents the camera matrix from the bracket shooting carried out thereafter. The position/attitude of the camera is changing due to hand shake. First, a group of spatial points is obtained by back-projecting the range image from each bracket onto a local camera coordinate space on the basis of shooting information obtained at the time of each shot. The internal camera parameters $K_i$ at the time each bracket is shot are known through Expression 14. The internal camera parameters for one bracket are represented by K, and the internal camera parameters for the other bracket are represented by K'. Then, handling the image coordinates p and q and the distance value d, and the image coordinates p' and q' and the distance value d', of the respective range images as vectors, back-projection conversion is carried out using $(p_i, q_i, d_i)$ and $(p'_i, q'_i, d'_i)$, where $i=1, 2, \ldots, N$.

$$\vec{X}_i = \begin{bmatrix} X_i \\ Y_i \\ Z_i \end{bmatrix} (i = 1, 2, \ldots, N) \tag{33}$$

Here, $$X_i = \frac{p_i - C_x}{f} d, \tag{34}$$
$$Y_i = \frac{q_i - C_y}{f} d,$$
$$Z_i = d$$

$$\vec{X}'_i = \begin{bmatrix} X'_i \\ Y'_i \\ Z'_i \end{bmatrix} (i = 1, 2, \ldots, N) \tag{35}$$

Here, $$X'_i = \frac{p'_i - C'_x}{f'} d', \quad Y'_i = \frac{q'_i - C'_y}{f'} d', \quad Z'_i = d' \tag{36}$$

Through this, the values in the range images can be converted into corresponding groups of spatial points in the local coordinates.

FIG. 13B illustrates an example in which the values of the range images have been back-projected and converted into groups of spatial points in the camera local coordinates for each instance of bracket shooting. In this example, in the first bracket, the focus is on the near side, and thus a near-side range image is obtained, in the next bracket, the focus is on the far side, and thus the range image is also obtained on the far side. However, a common region is present in the range information of a middle-distance region.

Here a method for estimating the position/attitude by associating three-dimensional spaces with each other using a generally-known ICP method ("Advanced Guide to Computer Vision 3", Chapter 2, "ICP Algorithms", Ken Masuda, pp. 33-62) will be described. The relative positions/attitudes between camera coordinates can be estimated from the alignment of a three-dimensional rigid body between a spatial point $\vec{X}$, which is obtained from conversion carried out by back-projecting the range image from a given bracket, and a spatial point $\vec{X}''$, which is found from the range image of a different bracket.

In other words, the relative positions/attitudes between camera coordinates can be estimated by deforming a three-dimensional rigid body having handled the spatial point $\vec{X}$ and the spatial point $\vec{X}''$ from different bracket shots as still regions. The position/attitude of the camera is found through the following Expression 37 and Expression 38.

$$\vec{X}'' = R\vec{X}' + \vec{t} \tag{37}$$

$$n = \arg\min_{R,\vec{t}} \{\vec{X} - \vec{X}''\} \tag{38}$$

Here, $\vec{X}$ and $\vec{X}'$ are spatial points back-projected from range images, and R and $\vec{t}$ indicate a relationship between the camera coordinates of the spatial points back-projected from the respective range images. $\vec{X}''$ represents a spatial point obtained through coordinate conversion of the three-dimensional spatial point $\vec{X}'$ using the position/attitude of the camera. The search is then optimized by using the relative position/attitude $\vec{R}_{ini}$ and $\vec{t}_{ini}$ calculated from the relationship between the images as the initial values of R and $\vec{t}$. When the optimization is converged on, the relative position/attitude changes $\vec{R}_{ref}$ and $\vec{t}_{ref}$ of the image capturing apparatus 100 refined by the alignment of the point group can be obtained.

RANSAC is included internally, and thus even if there are different numbers of elements between the spatial points $\vec{X}$ and $\vec{X}''$ or between corresponding range images, or if no association has been carried out in advance, a value in which the relative position/attitude among the camera coordinates has been refined can be obtained from the geometric positional relationship of the three-dimensional spatial points.

Figure 13C:
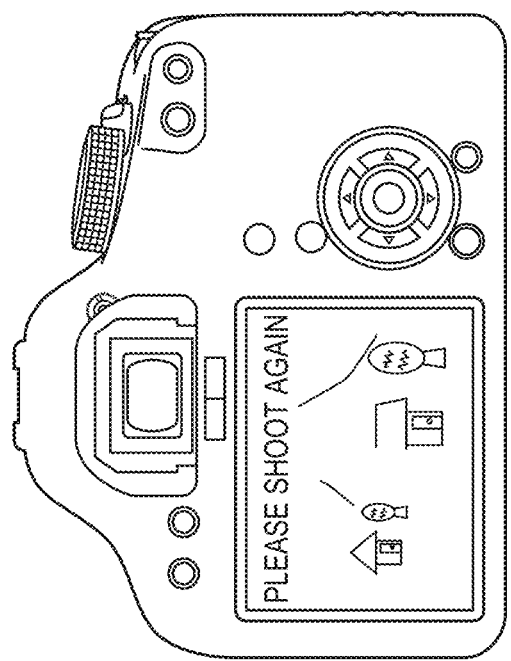

FIG. 13C is a diagram in which refined values $\vec{R}_{ref}$ and $\vec{t}_{ref}$ for the positions/attitudes of adjacent brackets have been obtained through point group alignment. Positions/attitudes $\vec{R}_{ref}$ and $\vec{t}_{ref}$ between cameras, where the point groups of the middle-distance regions match, have been successfully obtained.

Although the present embodiment describes back-projecting all points in the range images and using those points in the alignment, it is also possible to back-project only elements in depth-direction range images corresponding to the common regions of the regions where bracket rangefinding is possible, and use those elements to refine the relative position/attitude between the camera coordinates.

A highly-accurate relative position/attitude among the camera coordinates can be obtained by estimating the relative position/attitude between the camera coordinates in the images, and then estimating while further refining the relative position/attitude between the camera coordinates using the range images.

The positional skew amount calculation method has thus far been described without specifying whether the calculation is sequential computations carried out during the continuous bracket shooting or the calculation is carried out after the continuous bracket shooting has been finished completely. However, calculations may be carried out sequentially when shooting each bracket in the continuous bracket shooting and then used to provide a reaction to the user.

For example, the image capturing apparatus 100 executes the process of step S302 or step S303 in FIG. 10 during each instance of bracket shooting in step S102, after the pan focus shooting (step S101 of FIG. 3). Then, on the basis of a ratio of image skew amount motion vectors, the magnitudes of the vectors, and so on for the feature points calculated in step S302, the image capturing apparatus 100 determines the magnitude of skew in the position and attitude of the image capturing apparatus 100 between the brackets caused by hand shake. Alternatively, using the positional skew amount obtained in step S303, the image capturing apparatus 100 checks the magnitude of motion caused by the handshake on the basis of the change in the attitude, position, or the like. For example, the magnitude of the motion of the image capturing apparatus 100 caused by hand shake is checked on the basis of a rotation amount, when the change in attitude is used and the motion is being expressed as a rotational axis and a rotational amount, or on the basis of a magnitude of displacement in a constant distance scale with a spatial point, when the change in position is used. In other words, the user can be warned when the amount by which the image appearing in the current bracket image overlaps with the guide image has dropped, when there is a large change in the position/orientation of the image capturing apparatus 100, and so on.

Figure 14:
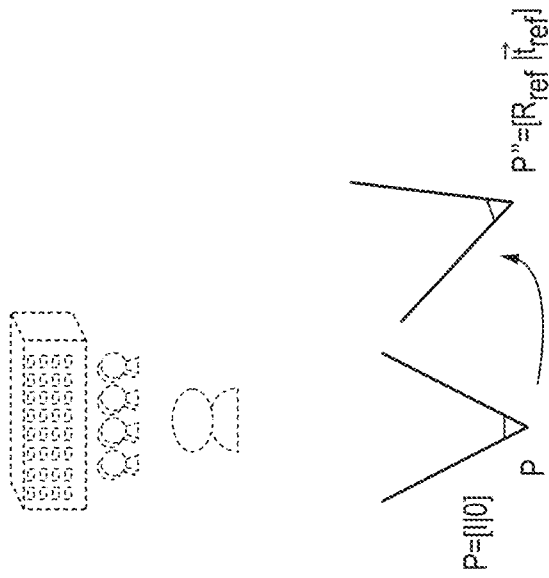
FIG. 14 is a diagram illustrating an example of a message prompting a user to take another shot.

For example, consider a case where the positional skew correction unit 105 has issued, to the control unit 107, a warning indicating that there is a large amount of hand shake during a given instance of bracket shooting. In this case, the control unit 107 can control the optical system control unit 104 so as not to allow the bracket focus to change, and then automatically attempt to take the shot again using the same focus. Alternatively, the control unit 107 may carry out control for changing the focus variation span over a series of continuous bracket shots, and then take the shots again as a loop, carrying out the looped shooting until a set of parallax images and range image are obtained from bracket continuous shooting carried out with the hand shake being within a predetermined range. Alternatively, as illustrated in FIG. 14, the control unit 107 may display a message indicating that there is a large degree of hand shake in a display unit of the image capturing apparatus 100 during bracket continuous shooting, and the user may be prompted to take the shot again.

The positional skew correction unit 105 may calculate (detect) the positional skew amount pertaining to the current instance of shooting each time a shot is taken for a bracket (i.e., in each of a plurality of instances of shooting), and then determine whether or not the positional skew amount is greater than or equal to a threshold. If it is determined that the positional skew amount is greater than or equal to the threshold, the control unit 107 carries out control for retaking the current shot before the next shot is taken. This makes it possible to quickly retake a shot in which there is a large degree of hand shake.

Once the change in the position/attitude of the image capturing apparatus 100 has been found between the respective brackets, positional skew correction is carried out on the range image in each bracket, using one of the positions/attitudes of the image capturing apparatus 100 as reference coordinates. As illustrated in FIG. 12, the position/attitude of the image capturing apparatus 100 when the pan-focus image is shot, and the relative positions/attitudes of the respective instances of bracket shooting, have been found, and these relationships are therefore used to cavy out the positional skew correction on all of the range images.

For example, consider a case where positional skew correction is carried out to convert the range image from a given bracket BR1 into camera coordinates of the image capturing apparatus 100 from the time when the pan-focus image is shot. In this case, as illustrated in FIG. 15A, the range image is first back-projected onto spatial points using an internal camera matrix from when the bracket image corresponding to BR1 was shot, according to Expression 33 and Expression 34. Then, the spatial points are subjected to three-dimensional coordinate conversion (Expression 39) using the relative position/attitude $M_{P1}$ of the image capturing apparatus 100 at the time when the bracket image BR1 is shot, relative to the image capturing apparatus 100 from when the pan-focus image is shot. FIG. 15B is a diagram illustrating a process for applying three-dimensional conversion to a back-projected group of points.

$$X'' = M_{P1}^{-1} X \tag{39}$$

Here, X represents the back-projected spatial point, and X'' represents the spatial point to which the positional skew correction has been applied. Finally, a range image that has been subjected to positional skew correction can be obtained by once again projecting the post-positional skew correction spatial points onto the range image using the internal camera matrix when the pan-focus image is shot (see Expression 40). FIG. 15C is a diagram illustrating a process for reobtaining a range image by projecting a group of points.

$$\tilde{p} = K\tilde{X}'', \text{ where} \tag{40}$$

$$\tilde{X}''_t = \begin{bmatrix} X''_t \\ Y''_t \\ Z''_t \end{bmatrix},$$

$$\tilde{X}''_i = \begin{bmatrix} \overline{X}''_t \\ 1 \end{bmatrix},$$

$$\vec{P}_i = \begin{bmatrix} p_i \\ q_i \end{bmatrix},$$

$$\tilde{P}_i = \begin{bmatrix} \vec{p}_i \\ 1 \end{bmatrix}$$

The elements of the range image can be obtained in this manner.

$$(p_i, q_i, Z''_i) \tag{41}$$

$(p_i, q_i)$ represent image coordinates in the range image, and $Z''_i$ represents a distance value. The same type of positional skew correction is carried out on the other range images as well.

Although the position/attitude of the image capturing apparatus 100 when the pan-focus image is shot is described as the reference for the positional skew correction here, the position/attitude of the image capturing apparatus 100 from when any of the brackets is shot may be used as the conversion target camera coordinates for the positional skew correction. Using the camera coordinates of an image to form a pair with the integrated range image as reference coordinates for the positional skew correction, i.e., as the conversion target camera coordinates, is one favorable example. Even if the pan-focus image is selected, any one of the plurality of parallax images from any instance of bracket shooting may be selected.

If hand shake is present due to hand-held shooting, and the positional skew correction in step S102 of FIG. 3 is complete, in step S103, the range image integration unit 106 simply superimposes the range images. If the positional skew amount is only estimated in step S102, in step S103, the range image integration unit 106 carries out the integration after first applying positional skew correction to the range image from each instance of bracket shooting.

There are cases where there is regional overlap within the angle of view of the range images from bracket to bracket. In this case, the range image integration unit 106 integrates the plurality of range images into a single range image through statistical integration as described earlier, or by adding a priority order, weighting, or the like using an algorithm based on the magnitude of the subject in-focus distance, the defocus amount, or the like. Additionally, if only the process for calculating the positional skew amount is executed in the positional skew correction process of step S102, the positional skew correction may be carried out in order on the range images from the respective brackets during the range image integration, and the range images may be accumulated.

Additionally, rather than using the parallax images or mixed image from the pan-focus shooting or continuous bracket shooting, corresponding to the camera coordinates at which the integrated range image is generated, as the image to form a pair with the range image, a color image from another bracket or another viewpoint may be subject to viewpoint conversion and used as the color image for the final output.

The image viewpoint conversion can be carried out using the range image positional skew correction method described with reference to Expression 33, Expression 34, Expression 39, Expression 40, and Expression 41. For example, in the case of a mixed image, the range image to be used in the pair is first conversely subject to viewpoint conversion to the image camera coordinates. Then, color values or luminance values of the image are associated with the elements in the range image. Viewpoint conversion to the camera coordinates of the original range image is then carried out using the positional skew correction method. At this time, by linking the color or luminance values to a distance value point group at the time of the back-projection of the range image, and then carrying out the back-projection, three-dimensional rigid body conversion, and projection as described above, the viewpoint conversion to the camera coordinate system can be carried out for the range image. When the image is a parallax image, the relationship of the camera coordinates between the parallax image and the mixed image may be added to the viewpoint conversion.

According to the first embodiment described thus far, the image capturing apparatus 100 controls shooting so as to carry out focus bracket continuous shooting (a plurality of instances of shooting) and pan-focus shooting (a single instance of shooting). The pan-focus shooting is carried out in a state where the aperture is narrower than in the focus bracket continuous shooting, i.e., under shooting conditions in which the depth of field is deeper than in the focus bracket continuous shooting. The image capturing apparatus 100 generates a plurality of range images corresponding to the focus bracket continuous shooting. Each range image is generated on the basis of parallax among a plurality of parallax images generated in each bracket. The image capturing apparatus 100 detects a positional skew amount for each of a plurality of second images generated by the focus bracket continuous shooting (mixed images or parallax images included in a set of parallax images), relative to a first image generated by the pan-focus shooting (a mixed image or a parallax image). Then, the image capturing apparatus 100 corrects positional skew among the plurality of range images on the basis of the positional skew amount of each of the plurality of second images relative to the first image. Through this, positional skew among a plurality of range images obtained by continuous shooting can be corrected with a high level of accuracy, and a highly-accurate integrated range image can be generated from the plurality of range images.

Second Embodiment

A second embodiment will describe a configuration in which focus bracketing is not carried out during continuous shooting, and the plurality of range images are instead generated through continuous shooting with fixed focus. Stereo rangefinding using a small number of divisions has a characteristic whereby the stereo association is likely to include erroneous association. In this case, it is conceivable that variations in the point of view, variations in illumination, minute variations in the subject, and so on during hand-held shooting can sometimes be employed. In such situations, the distance measurement accuracy can be improved by repeatedly obtaining distance measurements through fixed-focus continuous shooting and then using time-direction filtering to suppress distance measurement detection error outliers caused by erroneous associations. However, when hand shake is present due to hand-held shooting, the range images obtained through continuous shooting cannot be integrated correctly. In particular, when the camera is set to a shallow depth of field and the hand shake occurs in the forward-backward direction of the image capturing apparatus, it tends to be unlikely for there to be common regions among the continuous shots, with respect to the appearance of the image, distance values, and so on. The present embodiment pertains to a technique for integrating the range images in such a case. The following will primarily describe areas that are different from the first embodiment.

Figure 16:
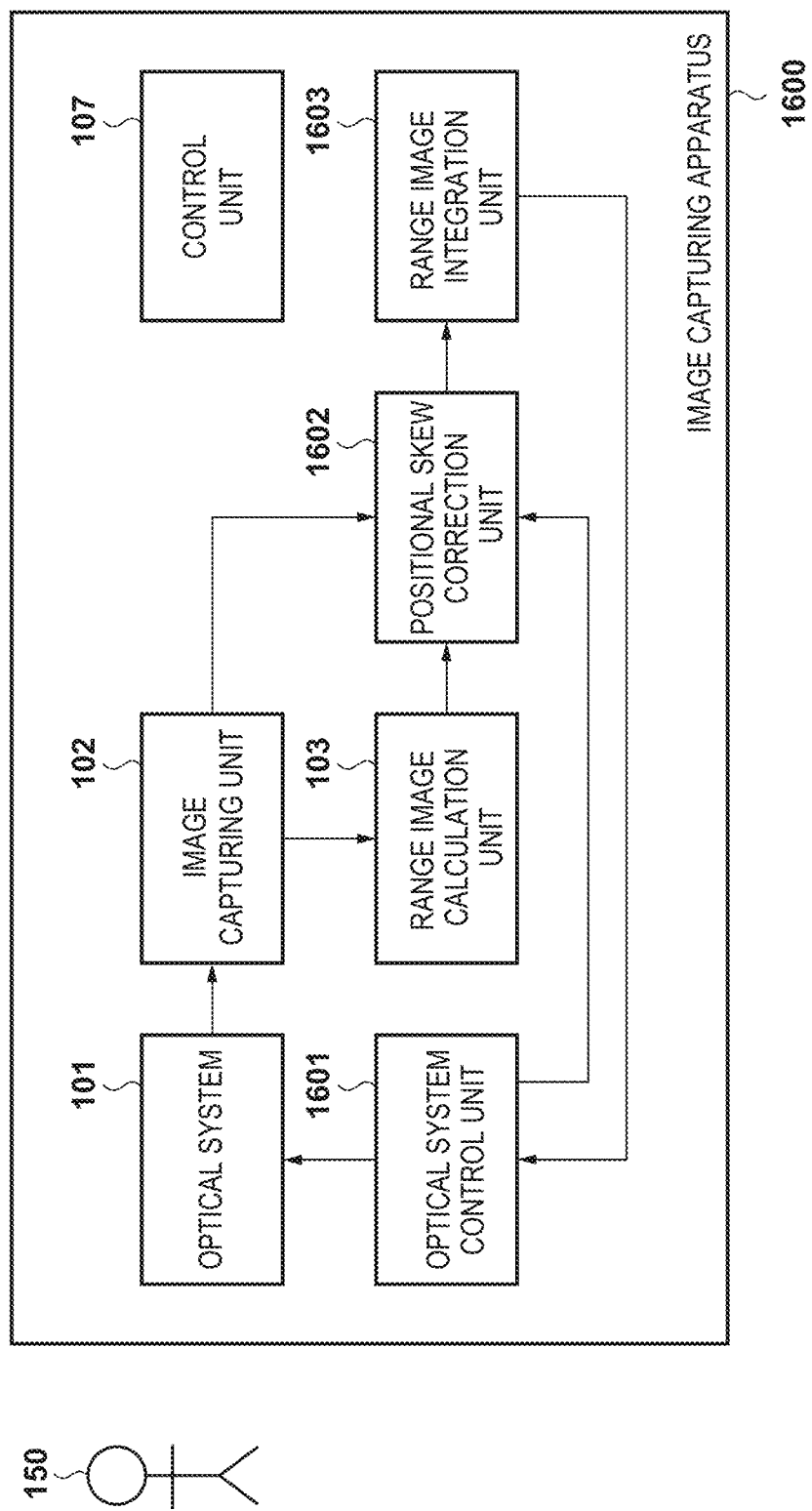
FIG. 16 is a block diagram illustrating the configuration of an image capturing apparatus 1600 according to a second embodiment.

FIG. 16 is a block diagram illustrating the configuration of an image capturing apparatus 1600 according to the second embodiment. The image capturing apparatus 1600 includes the optical system 101, the image capturing unit 102, the range image calculation unit 103, the control unit 107, an optical system control unit 1601, a positional skew correction unit 1602, and a range image integration unit 1603. Blocks having the same reference signs as those in the image capturing apparatus 100 illustrated in FIG. 1 will not be described.

The optical system control unit 1601 is a component that controls the aperture of the optical system 101. The positional skew correction unit 1602 calculates amounts of skew in the positions and attitudes of a plurality of sets of parallax images obtained through the continuous shooting (with each set including a plurality of parallax images), and in a plurality of range images generated by the range image calculation unit 103. The positional skew correction unit 1602 then corrects the position and attitude skew for one of the plurality of parallax images or the range image.

The range image integration unit 1603 carries out a process for integrating, into a single range image (an integrated range image), a plurality of range images corresponding to a plurality of sets of parallax images obtained from the continuous shooting. The range image integration unit 1603 may carry out a three-dimensional geometric transform with respect to the image capturing position of another image selected as a reference. The range image integration unit 1603 carries out statistical integration, corrects erroneous corresponding values in the range image, and reduces holes in the range image.

Figure 17:
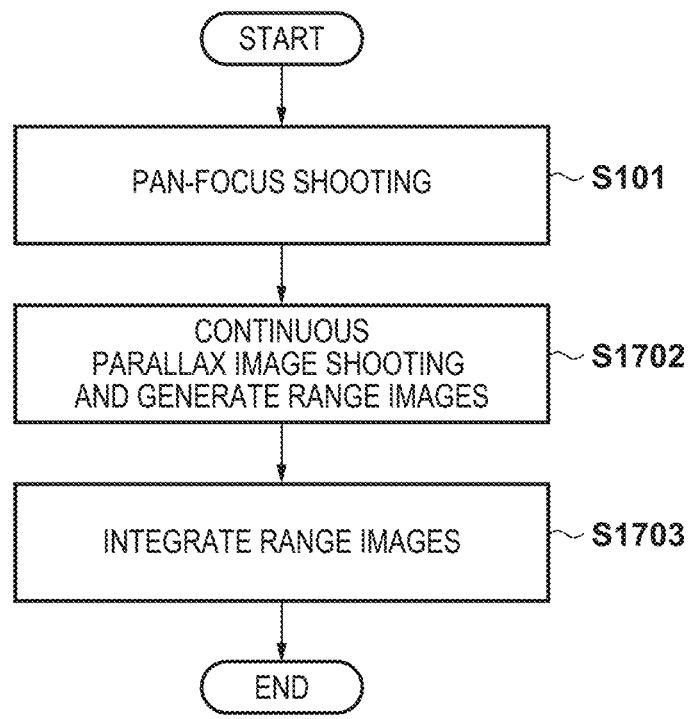
FIG. 17 is a flowchart illustrating a process for generating an integrated range image according to the second embodiment.

FIG. 17 is a flowchart illustrating a process for generating the integrated range image according to the second embodiment. Blocks having the same reference signs as those in the flowchart illustrated in FIG. 3 will not be described.

In step S1702, the control unit 107 carries out control for obtaining a plurality of sets of parallax images, which are to be used in the range image calculation, through continuous shooting. At this time, the range image calculation unit 103 generates a range image corresponding to each set of parallax images generated through the corresponding instance of shooting. The positional skew correction unit 1602 sequentially corrects positional skew. The rangefinding computation process is the same as the process described in the first embodiment. The details of the positional skew correction for the range image are also the same as in the first embodiment, and the positional skew correction unit 1602 sequentially carries out the positional skew correction on the range images using the pan-focus image shot in step S101 as a reference.

Unlike in the first embodiment, the aperture and focus are not changed during the continuous shooting in step S1702. As such, when estimating the positional skew amount in the continuous shooting, one of the viewpoint images in the mixed image or the parallax images included in the sets of parallax images may be used as a reference. However, when estimating the positional skew amount between the pan-focus shooting and one of the instances of rangefinding shooting, using the mixed image of the pan-focus image as the reference for the positional skew correction is simpler as it does not require unnecessary additional conversion. A plurality of range images obtained from continuous shooting based on matching camera coordinates are output. Variations in the viewpoint, variations in the illumination, minute variations in the subject, and so on caused by hand-held shooting are present among the plurality of range images.

Step S1703 is a step of statistically integrating the range images which have been obtained through continuous shooting and for which the positional skew correction is complete. There are cases where there is regional overlap within the angle of view of the range images between instances of the continuous shooting. In this case, as described earlier, outlier distance values, which are distance values that differ greatly, are excluded, and the plurality of range images are integrated into a single range image through statistical integration, or by adding a priority order, weighting, or the like using an algorithm based on the magnitude of the subject in-focus distance, the defocus amount, or the like. When variations in the viewpoint, variations in the illumination, minute variations in the subject, and so on caused by hand-held shooting are present, missing distance values caused by association errors in a single shot, unmeasurable parts resulting from mirror surface reflections, and the like can be effectively obtained from a separate shot. The distance values can also be found more accurately through a statistical process that includes the variations.

According to the second embodiment described thus far, the image capturing apparatus 1600 controls shooting so as to carry out fixed-focus continuous shooting (a plurality of instances of shooting) and pan-focus shooting (a single instance of shooting). The pan-focus shooting is carried out in a state where the aperture is narrower than in the fixed-focus continuous shooting, i.e., under shooting conditions in which the depth of field is deeper than in the fixed-focus continuous shooting. The image capturing apparatus 1600 generates a plurality of range images corresponding to the fixed-focus continuous shooting. Each range image is generated on the basis of parallax among a plurality of parallax images generated in each instance of the continuous shooting. The image capturing apparatus 1600 detects a positional skew amount for each of a plurality of second images generated by the fixed-focus continuous shooting (mixed images or parallax images included in a set of parallax images), relative to a first image generated by the pan-focus shooting (a mixed image or a parallax image). Then, the image capturing apparatus 1600 corrects positional skew among the plurality of range images on the basis of the positional skew amount of each of the plurality of second images relative to the first image. Through this, positional skew among a plurality of range images obtained by continuous shooting can be corrected with a high level of accuracy, and a highly-accurate integrated range image can be generated from the plurality of range images.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-076564, filed Apr. 12, 2019, which is hereby incorporated by reference herein in its entirety.

What is claimed is:

1. An image capturing apparatus, comprising:
an image sensor that outputs a plurality of parallax images in a single instance of shooting, the parallax images having different viewpoints; and
at least one processor and/or at least one circuit which functions as:

a shooting control unit configured to, using the image sensor, carry out first shooting and a plurality of instances of second shooting, the plurality of instances of second shooting being carried out under a shooting condition in which a depth of field is shallower than in the first shooting;

a generating unit configured to generate a plurality of range images corresponding to the plurality of instances of second shooting, each range image being generated on the basis of parallax among the plurality of parallax images generated in each instance of shooting;

a detection unit configured to detect an amount of positional skew, relative to a first image generated through the first shooting, of each of a plurality of second images generated through the plurality of instances of second shooting;

a correction unit configured to correct positional skew among the plurality of range images on the basis of the amount of positional skew of each of the plurality of second images relative to the first image; and a determination unit configured to determine whether or not the amount of positional skew is greater than or equal to a threshold, for each of a plurality of amounts of positional skew corresponding to the plurality of second images, wherein the shooting control unit carries out control to redo shooting, among the plurality of instances of second shooting, that corresponds to an amount of positional skew determined to be greater than or equal to the threshold.

2. The image capturing apparatus according to claim 1, wherein the at least one processor and/or at least one circuit further functions as:

an integrating unit configured to integrate the plurality of range images corrected by the correction unit.

3. The image capturing apparatus according to claim 2, wherein when rangefinding values are found simultaneously at same locations in the plurality of range images, the integrating unit uses, for the integration, a range image value created from a minimum defocus.

4. The image capturing apparatus according to claim 2, wherein when rangefinding values are found simultaneously at same locations in the plurality of range images, the integrating unit uses, for the integration, a range image value satisfying both a minimum defocus and a shortest subject in-focus distance.

5. The image capturing apparatus according to claim 2, wherein when rangefinding values are found simultaneously at same locations in the plurality of range images, the integrating unit uses, for the integration, a range image value corresponding to one among the plurality of second images with respect to which a correlation value or spatial frequency is similar to or exceeding that of the first image.

6. The image capturing apparatus according to claim 1, wherein the image sensor is configured to receive light beams passing through a plurality of different pupil regions within an exit pupil of an image forming optical system.

7. The image capturing apparatus according to claim 6, wherein the first image is an image corresponding to the light beams passing through the plurality of pupil regions in the first shooting; and each of the plurality of second images is an image corresponding to the light beams passing through the plurality of pupil regions in a corresponding one of the plurality of instances of second shooting.

8. The image capturing apparatus according to claim 6, wherein the first image is an image corresponding to a light beam passing through a first pupil region, among the plurality of pupil regions, in the first shooting; and each of the plurality of second images is a parallax image corresponding to the first pupil region, among the plurality of parallax images generated in the respective instances of shooting.

9. The image capturing apparatus according to claim 1, wherein the shooting control unit carries out control so that the first shooting is carried out before the plurality of instances of second shooting; and when each of the plurality of instances of second shooting is carried out, the detection unit detects the amount of positional skew corresponding to the second image generated through a current instance of shooting; the determination unit determines whether or not the amount of positional skew, corresponding to the second image generated through the current instance of shooting, is greater than or equal to the threshold; and when it has been determined that the amount of positional skew corresponding to the second image generated through the current instance of shooting is greater than or equal to the threshold, the shooting control unit carries out control so as to redo the current instance of shooting before a next instance of shooting.

10. The image capturing apparatus according to claim 1, wherein the plurality of instances of second shooting are focus bracketing continuous shooting in which a plurality of instances of shooting are carried out at different in-focus positions.

11. The image capturing apparatus according to claim 1, wherein the plurality of instances of second shooting are fixed-focus continuous shooting.

12. A control method of an image capturing apparatus having an image sensor that outputs a plurality of parallax images in a single instance of shooting, the parallax images having different viewpoints, the method comprising:

using the image sensor to carry out first shooting and a plurality of instances of second shooting, the plurality of instances of second shooting being carried out under a shooting condition in which a depth of field is shallower than in the first shooting;

generating a plurality of range images corresponding to the plurality of instances of second shooting, each range image being generated on the basis of parallax among the plurality of parallax images generated in each instance of shooting;

detecting an amount of positional skew, relative to a first image generated through the first shooting, of each of a plurality of second images generated through the plurality of instances of second shooting;

correcting positional skew among the plurality of range images on the basis of the amount of positional skew of each of the plurality of second images relative to the first image;

determining whether or not the amount of positional skew is greater than or equal to a threshold, for each of a plurality of amounts of positional skew corresponding to the plurality of second images; and carrying out control to redo shooting, among the plurality of instances of second shooting, that corresponds to an amount of positional skew determined to be greater than or equal to the threshold.

13. A non-transitory computer-readable storage medium which stores a program for causing a computer of an image capturing apparatus to execute a control method, the image capturing apparatus having an image sensor that outputs a plurality of parallax images in a single instance of shooting, the parallax images having different viewpoints, the method comprising:

using the image sensor to carry out first shooting and a plurality of instances of second shooting, the plurality of instances of second shooting being carried out under a shooting condition in which a depth of field is shallower than in the first shooting;

generating a plurality of range images corresponding to the plurality of instances of second shooting, each range image being generated on the basis of parallax among the plurality of parallax images generated in each instance of shooting;

detecting an amount of positional skew, relative to a first image generated through the first shooting, of each of a plurality of second images generated through the plurality of instances of second shooting;

correcting positional skew among the plurality of range images on the basis of the amount of positional skew of each of the plurality of second images relative to the first image;

determining whether or not the amount of positional skew is greater than or equal to a threshold, for each of a plurality of amounts of positional skew corresponding to the plurality of second images; and carrying out control to redo shooting, among the plurality of instances of second shooting, that corresponds to an amount of positional skew determined to be greater than or equal to the threshold.

\* \* \* \* \*